(12) United States Patent
Kusaka

(10) Patent No.: US 8,009,223 B2
(45) Date of Patent: Aug. 30, 2011

(54) IMAGE SENSOR, FOCUS DETECTION DEVICE, FOCUS ADJUSTMENT DEVICE AND IMAGE-CAPTURING APPARATUS

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 450 days.

(21) Appl. No.: 12/318,123

(22) Filed: Dec. 22, 2008

(65) Prior Publication Data

US 2009/0167927 A1    Jul. 2, 2009

Related U.S. Application Data

(60) Provisional application No. 61/009,146, filed on Dec. 27, 2007.

(30) Foreign Application Priority Data

Dec. 26, 2007  (JP) ................................ 2007-334124

(51) Int. Cl.
    *H04N 5/232*        (2006.01)
(52) U.S. Cl. ...................................... 348/350; 348/280
(58) Field of Classification Search .................. 348/280, 348/345, 350
    See application file for complete search history.

(56) References Cited

U.S. PATENT DOCUMENTS 7,812,881 B2 * 10/2010 Kusaka ......................... 348/350

FOREIGN PATENT DOCUMENTS

JP    A-2007-279597    10/2007

* cited by examiner

*Primary Examiner* — W. B. Perkey
(74) *Attorney, Agent, or Firm* — Oliff & Berridge, PLC

(57) ABSTRACT

An image sensor includes: a plurality of imaging pixel rows, which include a plurality of types of imaging pixels with varying spectral sensitivity characteristic that are arrayed two-dimensionally based upon a first spectral sensitivity characteristics array pattern; and at least one non-imaging pixel row, which includes a plurality of non-imaging pixels that are disposed in place of some of the plurality of types of imaging pixels in the plurality of imaging pixel rows. The plurality of imaging pixel rows include adjacent imaging pixel rows made up with the plurality of types of imaging pixels and set adjacent to the non-imaging pixel row; and the adjacent imaging pixel rows assume a second spectral sensitivity characteristics array pattern different from the first spectral sensitivity characteristics array pattern, so that spectral sensitivity characteristics different from spectral sensitivity characteristics achieved in conformance to the first spectral sensitivity characteristics array pattern are achieved via specific imaging pixels making up part of the adjacent imaging pixel rows.

11 Claims, 20 Drawing Sheets

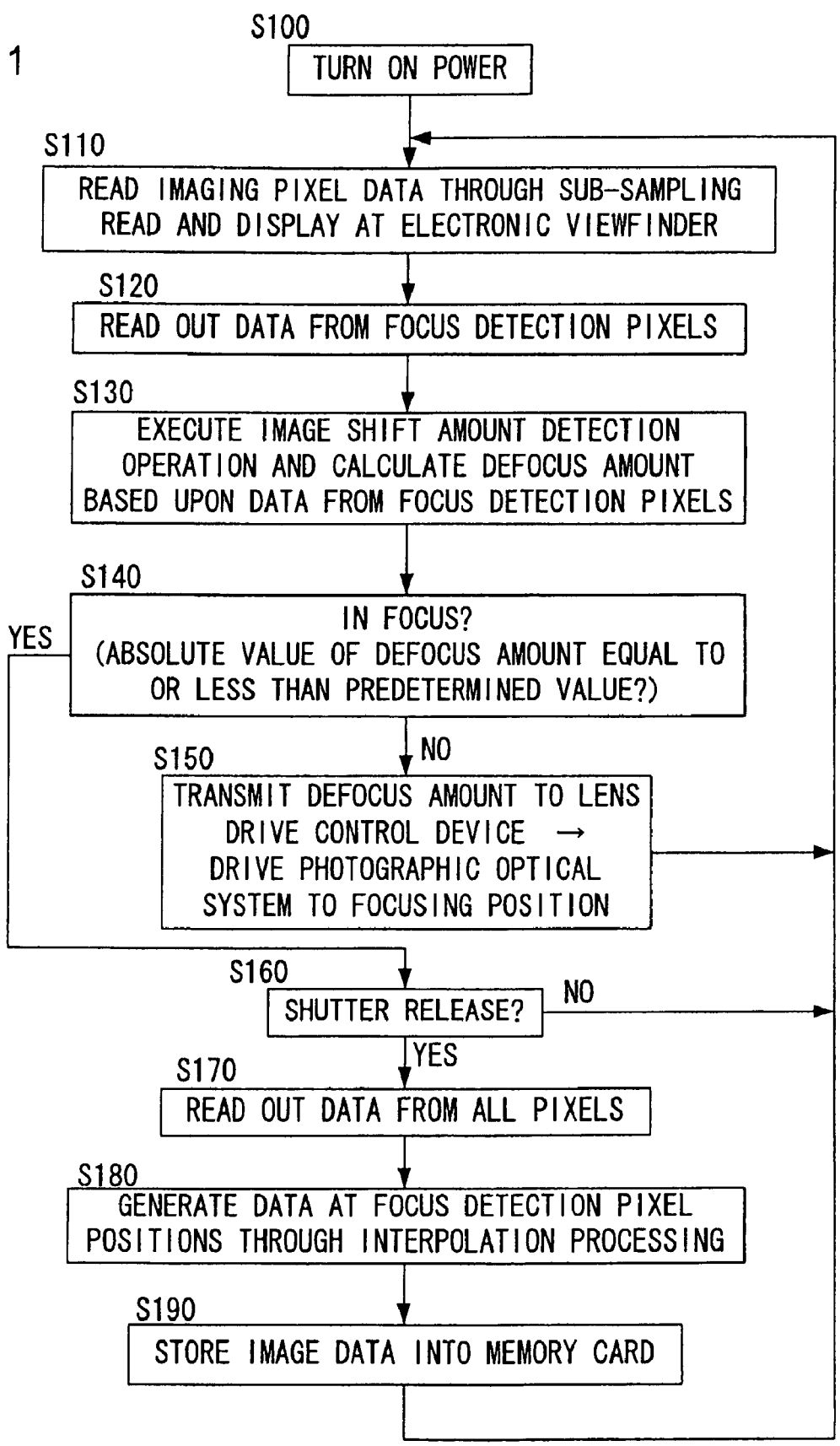

IMAGE SENSOR, FOCUS DETECTION DEVICE, FOCUS ADJUSTMENT DEVICE AND IMAGE-CAPTURING APPARATUS

This non-provisional application claims the benefit of U.S. Provisional Application No. 61/009,146 filed Dec. 27, 2007. This application also claims priority from Japanese Application No. 2007-334124 filed Dec. 26, 2007. The disclosure of each of the earlier applications is incorporated herein by reference in its entirety.

BACKGROUND OF THE INVENTION

1. Field of the Invention

The present invention relates to an image sensor, a focus detection device, a focus adjustment device and an image-capturing apparatus.

2. Description of Related Art

There are image-capturing apparatuses known in the related art such as that disclosed in Japanese Laid Open Patent Publication No. 2007-279597, equipped with an image sensor with focus detection pixels disposed in part of an imaging pixel array, in which image signals at positions occupied by the focus detection pixels are generated through pixel interpolation executed based upon pixel signals at imaging pixels present around the focus detection pixels.

SUMMARY OF THE INVENTION

There is an issue yet to be effectively addressed in the image-capturing apparatuses in the related art described above in that an image signal at a position occupied by a focus detection pixel may sometimes have to be calculated through pixel interpolation executed based upon the pixel signals at imaging pixels present over significant distances from the focus detection pixel position to result in poorer image quality.

For instance, if a plurality of focus detection pixels are disposed at positions that would otherwise be occupied by green pixels and blue pixels disposed in a straight line at an image sensor with red pixels, green pixels and blue pixels disposed in a Bayer array, a pixel signal at a position that would otherwise be occupied by a blue pixel shall need to be calculated based upon the pixel signals at blue pixels set apart from the target position by one pixel. This means that if an image of a blue straight line or a blue edge is superimposed over the row of focus detection pixels, the extent of error of the pixel signal calculated for the position that would otherwise be occupied by the blue pixel is bound to be significant.

According to the 1st aspect of the present invention, an image sensor comprises: a plurality of imaging pixel rows, which include a plurality of types of imaging pixels with varying spectral sensitivity characteristic that are arrayed two-dimensionally based upon a first spectral sensitivity characteristics array pattern; and at least one non-imaging pixel row, which includes a plurality of non-imaging pixels that are disposed in place of some of the plurality of types of imaging pixels in the plurality of imaging pixel rows. The plurality of imaging pixel rows include adjacent imaging pixel rows made up with the plurality of types of imaging pixels and set adjacent to the non-imaging pixel row; and the adjacent imaging pixel rows assume a second spectral sensitivity characteristics array pattern different from the first spectral sensitivity characteristics array pattern, so that spectral sensitivity characteristics different from spectral sensitivity characteristics achieved in conformance to the first spectral sensitivity characteristics array pattern are achieved via specific imaging pixels making up part of the adjacent imaging pixel rows.

According to the 2nd aspect of the present invention, in the image sensor according to the 1st aspect, it is preferred that the specific imaging pixels all assume spectral sensitivity characteristics identical to one another.

According to the 3rd aspect of the present invention, in the image sensor according to the 2nd aspect, it is preferred that the non-imaging pixel row extends linearly; and the adjacent imaging pixel rows include a pair of adjacent pixel rows each set on either side of the non-imaging pixel row, phases of the second spectral sensitivity characteristics array pattern assumed for one of the adjacent imaging pixel rows making up the pair and the second spectral sensitivity characteristics array pattern assumed for the other adjacent imaging pixel row in the pair are offset relative to each other along a direction in which the non-imaging pixel row extends.

According to the 4th aspect of the present invention, in the image sensor according to the 2nd aspect, it is preferred that the non-imaging pixel row extends linearly; and the adjacent imaging pixel rows include a pair of adjacent pixel rows each set on either side of the non-imaging pixel row, and phases of the second spectral sensitivity characteristics array pattern assumed for one of the adjacent imaging pixel rows making up the pair and the second spectral sensitivity characteristics array pattern assumed for the other adjacent imaging pixel row in the pair are aligned relative to each other along a direction in which the non-imaging pixel row extends.

According to the 5th aspect of the present invention, in the image sensor according to the 3rd aspect, it is preferred that the plurality of types of imaging pixels disposed with the first spectral sensitivity characteristics array pattern include three types of imaging pixels with high levels of spectral sensitivity to red, green and blue; red pixels, green pixels and blue pixels, making up the three types of imaging pixels, are disposed in the plurality of imaging pixel rows in a Bayer array; the plurality of non-imaging pixels are disposed in place of the green pixels and blue pixels that are the some of the plurality of types of imaging pixels; and the adjacent imaging pixel rows contain the blue pixels.

According to the 6th aspect of the present invention, in the image sensor according to the 1st aspect, it is preferred that the plurality of non-imaging pixels are a plurality of focus detection pixels each equipped with a micro-lens and at least one photoelectric conversion unit, which output focus detection signals used to detect a focusing condition of an optical system through which an image is formed on a light-receiving surface of the image sensor.

According to the 7th aspect of the present invention, in the image sensor according to the 6th aspect, it is preferred that the plurality of focus detection pixels include first focus detection pixels and second focus detection pixels; the first focus detection pixels each include the micro-lens and a first photoelectric conversion unit disposed in correspondence to the micro-lens; the second focus detection pixels each include the micro-lens and a second photoelectric conversion unit disposed in correspondence to the micro-lens; and the first focus detection pixels and the second focus detection pixels are disposed alternately to each other in the non-imaging pixel row.

According to the 8th aspect of the present invention, in the image sensor according to the 6th aspect, it is preferred that the plurality of focus detection pixels each include the micro-lens and a pair of photoelectric conversion units disposed in correspondence to the micro-lens.

According to the 9th aspect of the present invention, a focus detection device comprises: an image sensor according to the 6th aspect; and a focus detection unit that detects the focusing condition of the optical system based upon the focus detection signals output from the plurality of focus detection pixels.

According to the 10th aspect of the present invention, a focus adjustment device comprises: a focus detection device according to the 9th aspect; and a focus adjustment unit that executes focus adjustment for the optical system based upon the focusing condition detected by the focus detection unit.

According to the 11th aspect of the present invention, an image-capturing apparatus comprises: an image sensor according to the 1st aspect; and an arithmetic operation unit that generates through arithmetic operation image signals at positions each occupied by each of the plurality of non-imaging pixels based upon pixel signals at the plurality of types of imaging pixels disposed in the adjacent imaging pixel rows with the second spectral sensitivity characteristics array pattern.

BRIEF DESCRIPTION OF THE DRAWINGS

FIG. 4A shows the structure of the imaging pixels, whereas

FIG. 11 presents a flowchart of the operation executed in the digital still camera (image-capturing apparatus) shown in FIG. 1;

DESCRIPTION OF PREFERRED EMBODIMENTS

Figure 1:
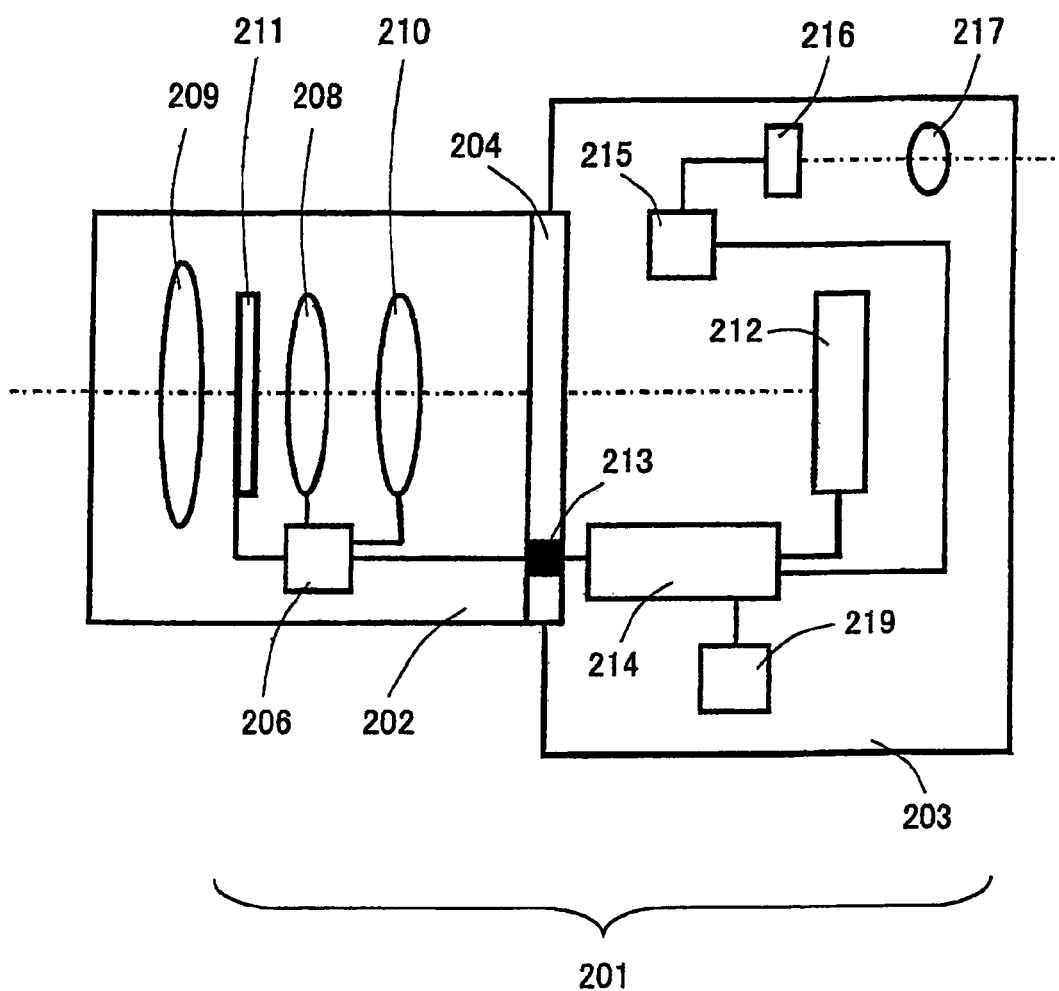
FIG. 1 is a lateral sectional view showing the structure adopted in the digital still camera (image-capturing apparatus) achieved in an embodiment.

A digital still camera that allows the use of interchangeable lenses is now described as an embodiment of the image sensor and the image-capturing apparatus according to the present invention. FIG. 1 is a lateral sectional view showing the structure adopted in a digital still camera (image-capturing apparatus) 201 achieved in the embodiment. The digital still camera 201 includes an interchangeable lens 202 and a camera body 203. The interchangeable lens 202 is mounted at the camera body 203 via a mount unit 204. Interchangeable lenses constituted with various photographic optical systems can be mounted at the camera body 203 via the mount unit 204.

The interchangeable lens 202 includes a lens 209, a zooming lens 208, a focusing lens 210, an aperture 211 and a lens drive control device 206. The lens drive control device 206 is constituted with a microcomputer, a memory, a drive control circuit and the like (none shown). It engages in communication with a body drive control device 214 to be detailed later to transmit lens information to the body drive control device 214 and receive camera information from the body drive control device 214, as well as executing drive control to adjust the focus of the focusing lens 210 and adjust the opening diameter at the aperture 211 and detecting the states of the zooming lens 208, the focusing lens 210 and the aperture 211. The aperture 211 forms an opening with an adjustable diameter centered on the optical axis in order to adjust the light quantity and the extent of blur.

An image sensor 212, the body drive control device 214, a liquid crystal display element drive circuit 215, a liquid crystal display element 216, an eyepiece lens 217, a memory card 219 and the like are disposed at the camera body 203. Imaging pixels are two-dimensionally arrayed at the image sensor 212 and focus detection pixels are also built into the image sensor over an area corresponding to a focus detection position. The image sensor 212 is to be described in detail later.

The body drive control device 214 comprises a microcomputer, a memory, a drive control circuit and the like. It repeatedly executes drive control of the image sensor 212, reads out image signals and focus detection signals, executes focus detection calculation based upon the focus detection signals and adjusts the focusing condition of the interchangeable lens 202. It also processes the image signals, records the processed image signals, controls camera operations and the like. In addition, the body drive control device 214 engages in communication with the lens drive control device 206 via an electrical contact point 213 to receive the lens information and transmit the camera information (indicating the defocus amount, the aperture value and the like).

The liquid crystal display element 216 functions as an electronic viewfinder (EVF). A live image (through image) provided by the image sensor 212, brought up on display at the liquid crystal display element 216 by the liquid crystal display element drive circuit 215, can be observed by the photographer via the eyepiece lens 217. The memory card 219 is an image storage medium in which an image captured by the image sensor 212 is stored.

A subject image is formed on the light-receiving surface of the image sensor 212 with a light flux having passed through the interchangeable lens 202. The subject image undergoes photoelectric conversion at the image sensor 212 and subsequently, image signals and focus detection signals are transmitted to the body drive control device 214.

The body drive control device 214 calculates the defocus amount based upon the focus detection signals output from the focus detection pixels at the image sensor 212 and transmits this defocus amount to the lens drive control device 206. In addition, the body drive control device 214 processes the image signals provided from the image sensor 212 and stores the image generated by processing the image signals into the memory card 219. It also provides through image signals from the image sensor 212 to the liquid crystal display element drive circuit 215 so as to bring up a through image on display at the liquid crystal display element 216. Moreover, the body drive control device 214 provides aperture control information to the lens drive control device 206 to enable control of the aperture 211.

The lens drive control device 206 adjusts the lens information in correspondence to the current focusing state, zooming state and aperture setting state, the maximum aperture F number and the like. More specifically, it detects the positions of the zooming lens 208 and the focusing lens 210 and the aperture value set for the aperture 211, and calculates correct lens information based upon the lens positions and the aperture value. Alternatively, it may select the lens information corresponding to the lens positions and the aperture value from a lookup table prepared in advance.

In addition, the lens drive control device 206 calculates a lens drive quantity indicating the extent to which the lens is to be driven based upon the defocus amount having been received and drives the focusing lens 210 to a focusing position based upon the lens drive quantity. The lens drive control device 206 also drives the aperture 211 in correspondence to the aperture value it has received.

Figure 2:
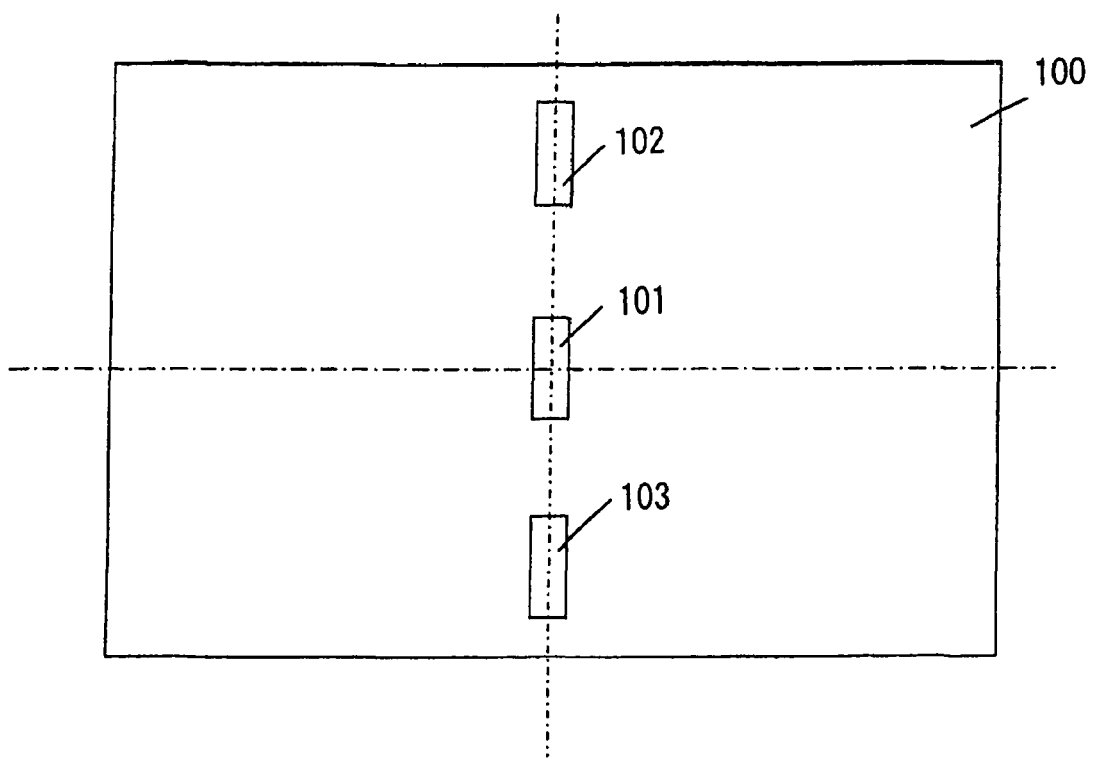
FIG. 2 indicates focus detection positions assumed on the photographic image plane of the interchangeable lens.

FIG. 2 indicates focus detection positions (focus detection areas) assumed on the photographic image plane 100 of the interchangeable lens 202. An image is sampled in order to detect the focusing condition of the interchangeable lens 202 at the focus detection pixel columns set at the image sensor 212 as explained later. FIG. 2 presents an example of focus detection pixel column areas, i.e., focus detection areas assumed on the photographic image plane 100. In this example, three focus detection areas 101, 102 and 103 are set at the center and on the upper side and the lower side on the rectangular photographic image plane 100. A plurality of focus detection pixels are arrayed in a straight line along the longer side of each rectangular focus detection area.

Figure 3:
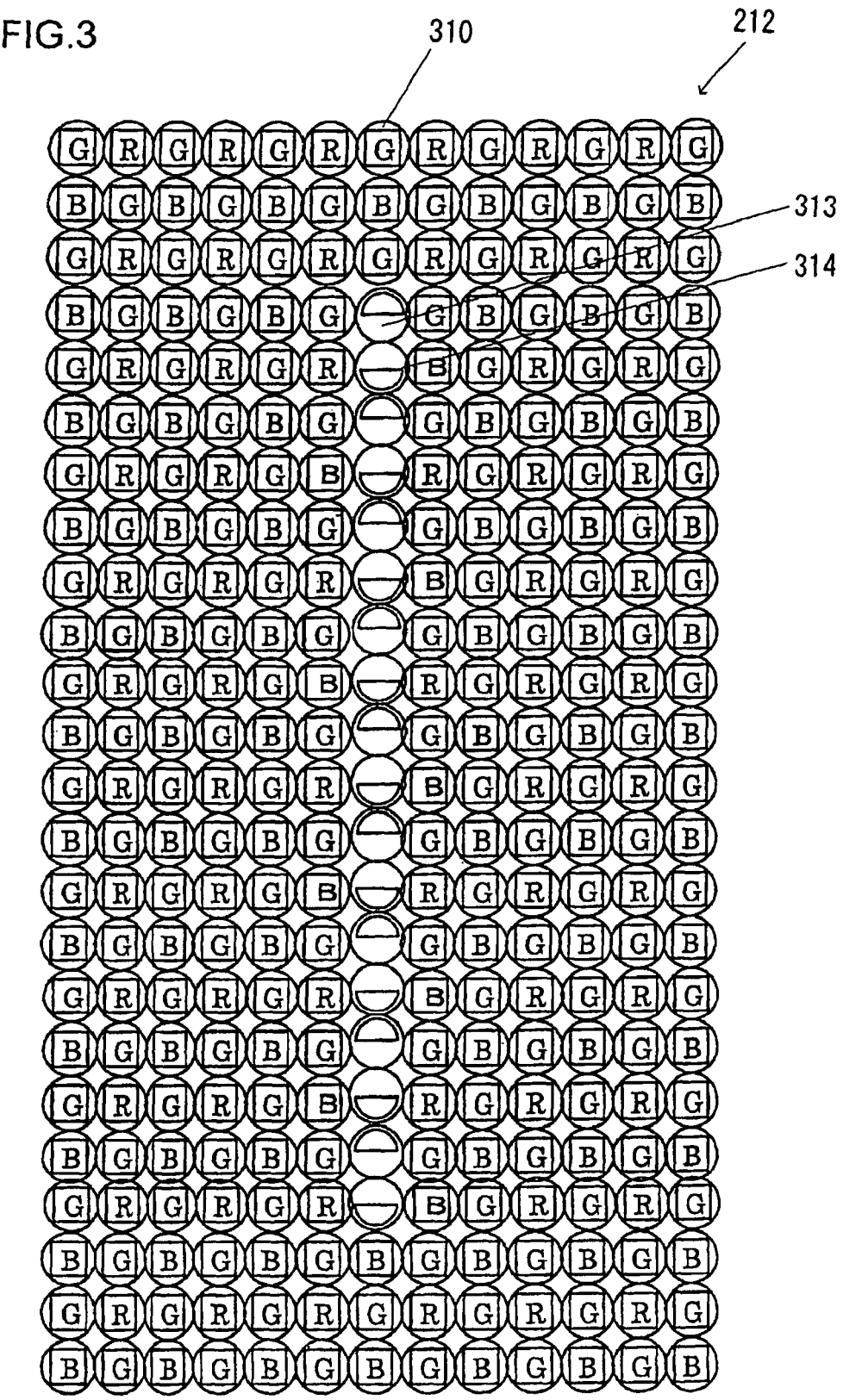
FIG. 3 is a front view showing in detail the structure of the image sensor.

FIG. 3 is a front view showing in detail the structure adopted in the image sensor 212, in an enlargement of the area around a focus detection area 101, 102 or 103 on the image sensor 212. At the image sensor 212, imaging pixels 310 are disposed in a dense, two-dimensional square grid array, with focus detection pixels 313 and 314, which are engaged in focus detection, alternately disposed next to each other along a vertical straight line at each of the focus detection areas 101, 102 and 103.

Figure 4:
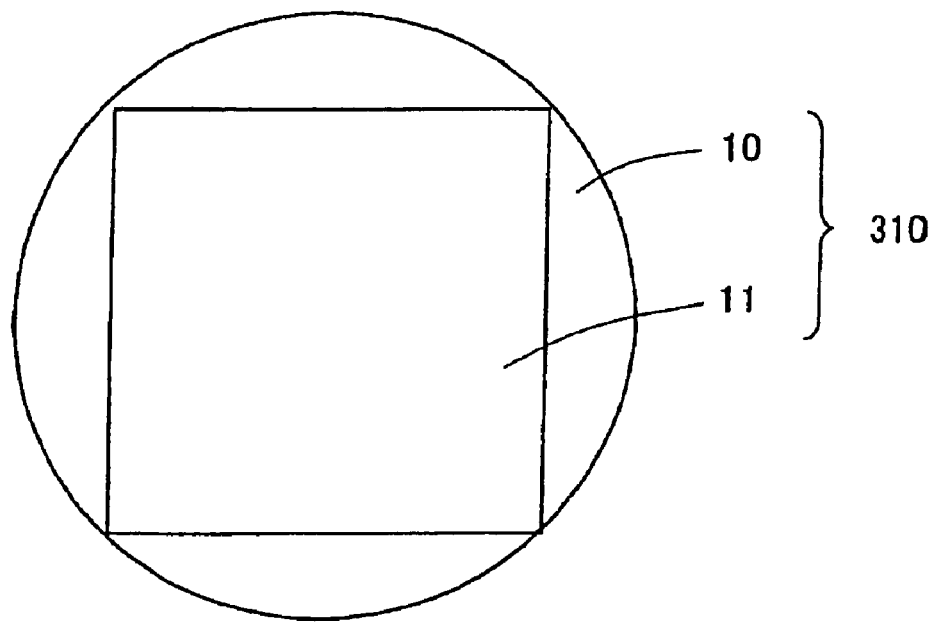
Figure 4B:
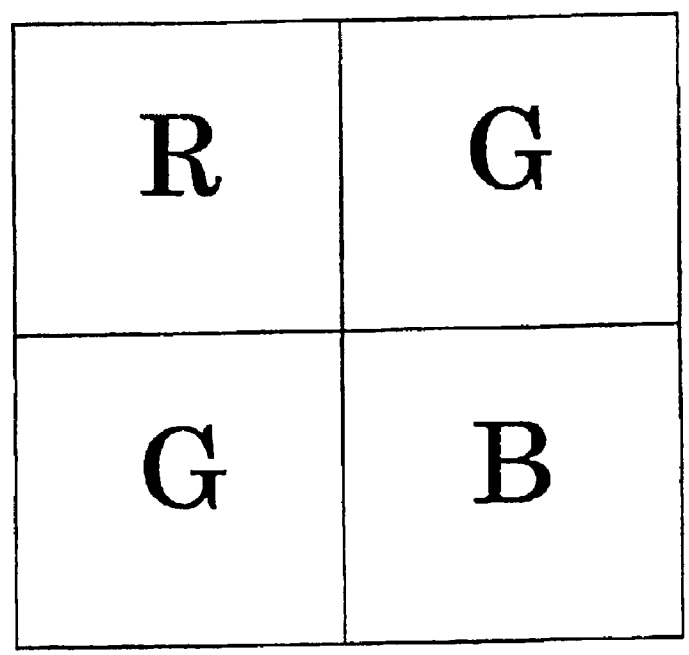
FIG. 4B illustrates the positional arrangement assumed for the imaging pixels.

As shown in FIG. 4A, the imaging pixels 310 are each constituted with a micro-lens 10, a photoelectric conversion unit 11 and a color filter (not shown). The color filters disposed at the imaging pixels include red (R) color filters, green (G) color filters and blue (B) color filters assuming the spectral sensitivity characteristics shown in FIG. 6. Four imaging pixels 310 each equipped with a color filter constitutes a pixel unit in a Bayer array, as shown in FIG. 4B, and this pixel unit is two-dimensionally reiterated at the image sensor 212. It is to be noted that in the imaging pixel columns that enclose a focus detection pixel column between them, the imaging pixels 310 are disposed in a pattern different from that of the Bayer array.

Figure 5A:
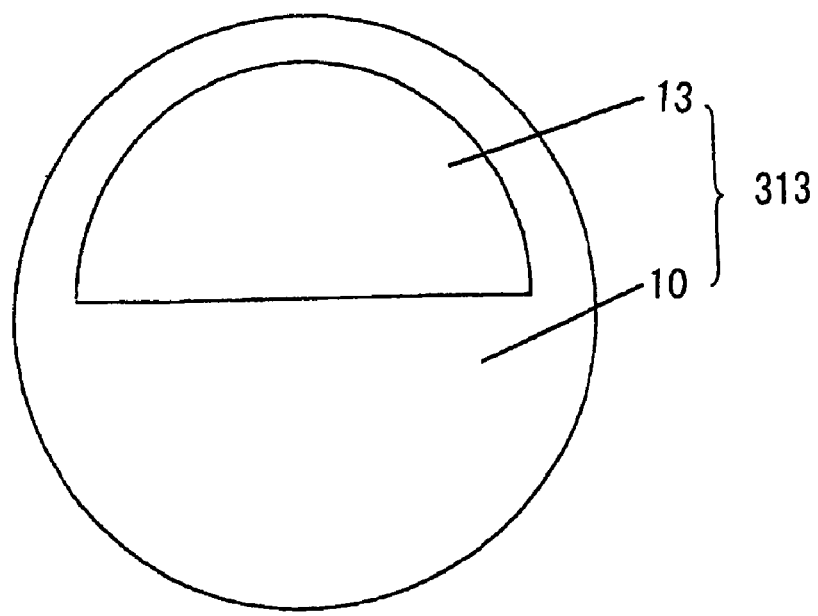
FIGS. 5A and 5B each illustrate the structure of a focus detection pixel.
Figure 5B:
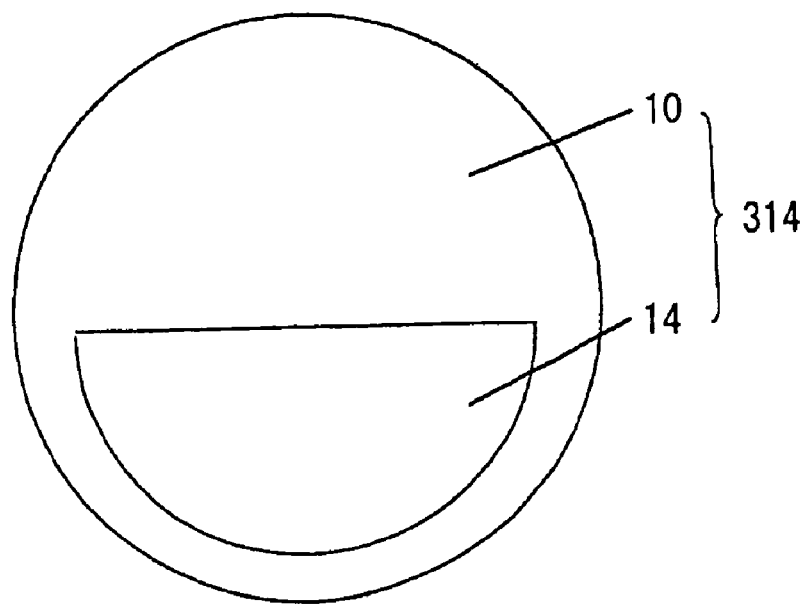

The focus detection pixels 313 are each constituted with a micro-lens 10 and a photoelectric conversion unit 13 assuming a semicircular shape, as shown in FIG. 5A. Likewise, the focus detection pixels 314 are each constituted with a micro-lens 10 and a photoelectric conversion unit 14 assuming a semicircular shape, as shown in FIG. 5B. When a focus detection pixel 313 and a focus detection pixel 314 are aligned with their micro-lenses 10 stacked one on top of the other, their photoelectric conversion units 13 and 14 range side by side along the vertical direction. The focus detection pixels 313 and the focus detection pixels 314 are disposed alternately to each other along the vertical direction (along the direction in which the photoelectric conversion units 13 and 14 range side by side) over the focus detection area 101.

Figure 6:
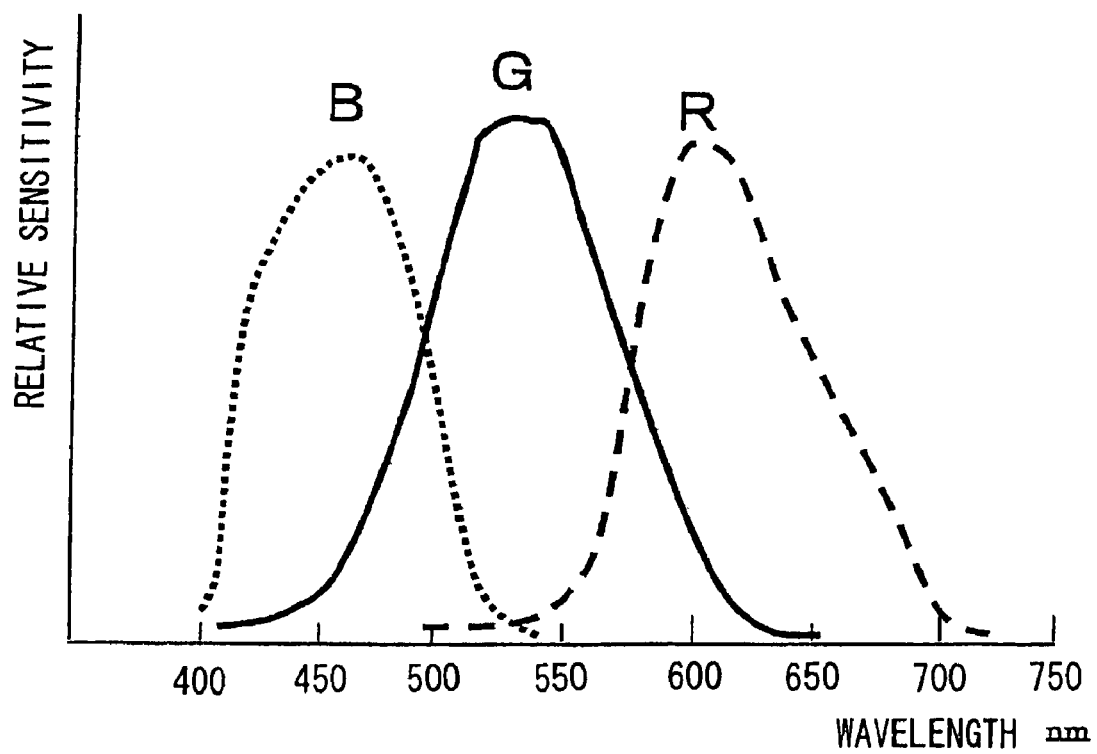
FIG. 6 shows the spectral sensitivity characteristics of the imaging pixels.
Figure 7:
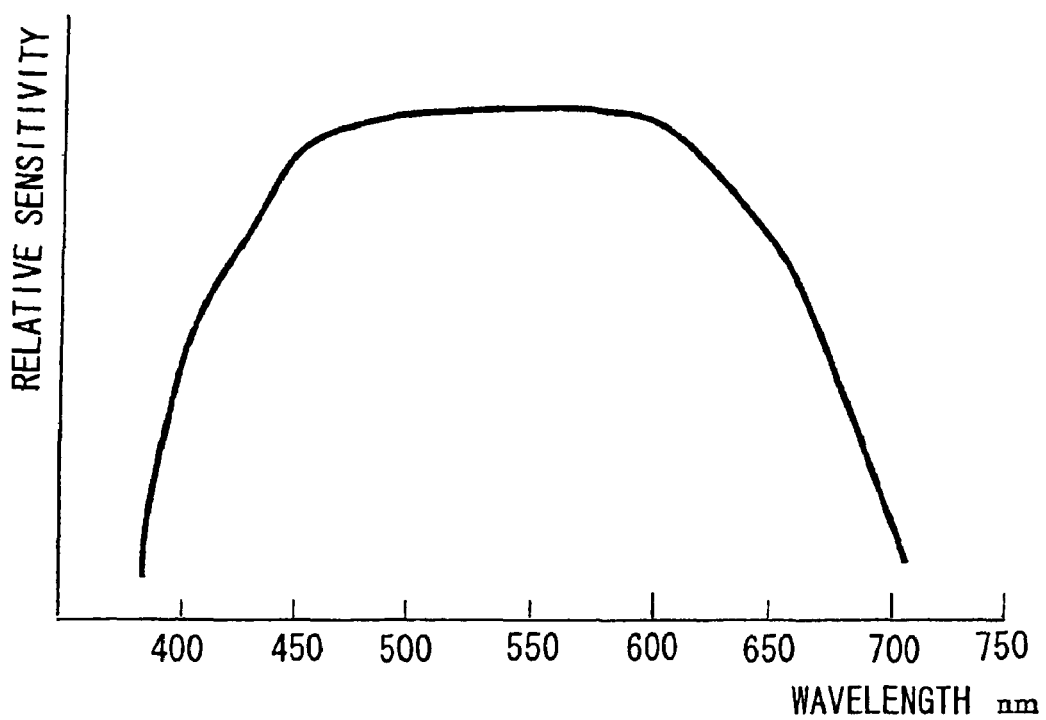
FIG. 7 shows the spectral sensitivity characteristics of the focus detection pixels.

No color filters are disposed at the focus detection pixels 313 and 314 in order to assure a sufficient amount of light and they assume spectral sensitivity characteristics achieved by integrating (see FIG. 7) of the spectral sensitivity of the photodiodes at which the photoelectric conversion takes place and the spectral sensitivity of the infrared filters (not shown), which also represents the sum of the spectral sensitivity characteristics of the green pixels, the red pixels and the blue pixels shown in FIG. 6. The light wavelength range of the focus detection pixel sensitivity is large enough to contain the light wavelength ranges of the sensitivity characteristics corresponding to the green pixels, the red pixels and the blue pixels.

The focus detection pixels 313 and 314 engaged in focus detection are disposed in a column where blue pixels (B) and green pixels (G) among the imaging pixels 310 should otherwise be disposed. The focus detection pixels 313 and 314 used for focus detection occupy positions in the column that would otherwise be occupied by blue pixels (B) and green pixels (G) which are imaging pixels 310, since the characteristics of human visual perception are such that the interpolation error occurring at blue pixels during pixel interpolation processing is less discernible than the interpolation error occurring at red pixels.

The photoelectric conversion units 11 at the imaging pixels 310 are designed in such a shape that the entire light flux passing through the exit pupil (e.g., F1.0) of the fastest interchangeable lens is all received via the micro-lens 10. The photoelectric conversion units 13 and 14 at the focus detection pixels 313 and 314 are each designed in such a shape that all the light flux passing through a predetermined area (e.g., F2.8) of the exit pupil of the interchangeable lens is received via the micro-lens 10.

Figure 8:
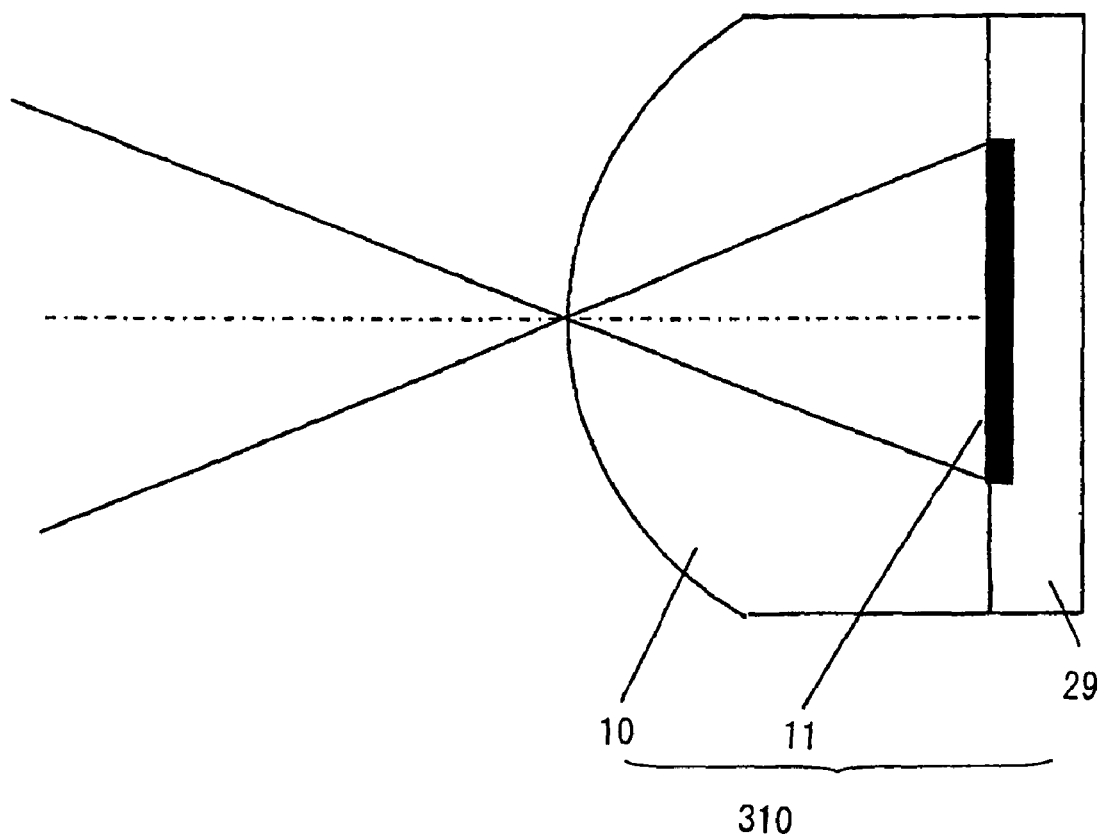
FIG. 8 is a sectional view of an imaging pixel.

FIG. 8 is a sectional view of an imaging pixel 310. The micro-lens 10 is set to the front of the imaging photoelectric conversion unit 11 at the imaging pixel 310 and, as a result, an image of the photoelectric conversion unit 11 is projected frontward via the micro-lens 10. The photoelectric conversion unit 11 is formed on a semiconductor circuit substrate 29. The color filter (not shown) is disposed at a midway position between the micro-lens 10 and the photoelectric conversion unit 11.

Figure 9A:
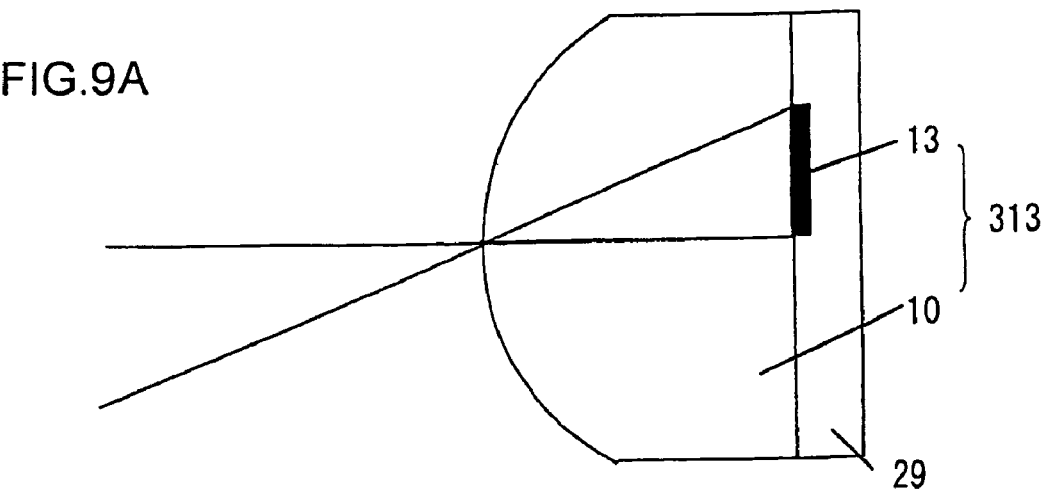
FIGS. 9A and 9B each present a sectional view of a focus detection pixel.

FIG. 9A is a sectional view of a focus detection pixel 313. A focus detection pixel 313, disposed in the focus detection area 101 set at the center of the image plane includes a micro-lens 10 disposed to the front of the photoelectric conversion unit 13 and an image of the photoelectric conversion unit 13 is projected frontward via the micro-lens 10. The photoelectric conversion unit 13 is formed on the semiconductor circuit substrate 29, with the micro-lens 10 fixed as an integrated part thereof through a semiconductor image sensor manufacturing process.

Figure 9B:
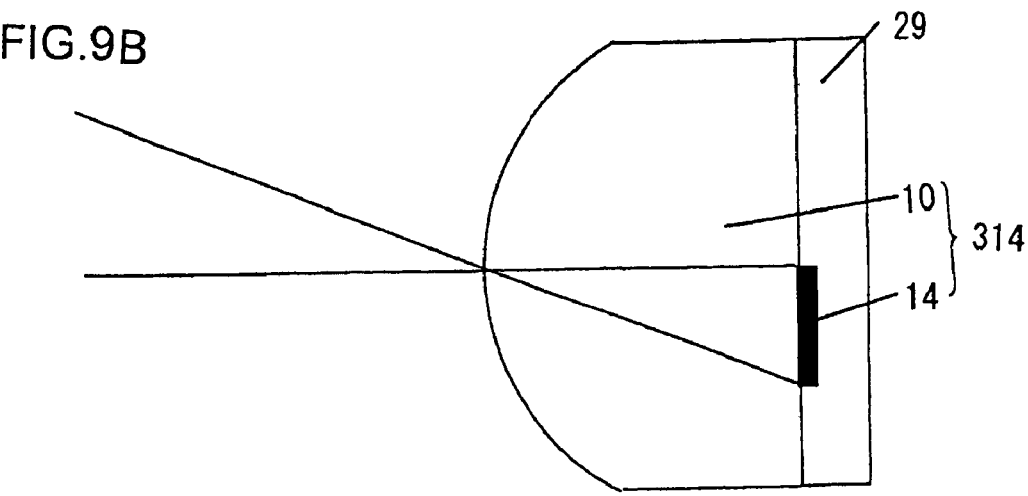

FIG. 9B is a sectional view of a focus detection pixel 314. A focus detection pixel 314 disposed in the focus detection area 101 set at the center of the image plane includes a micro-lens 10 disposed to the front of the photoelectric conversion unit 14 and an image of the photoelectric conversion unit 14 is projected frontward via the micro-lens 10. The photoelectric conversion unit 14 is formed on the semiconductor circuit substrate 29, with the micro-lens 10 fixed as an integrated part thereof through a semiconductor image sensor manufacturing process.

Figure 10:
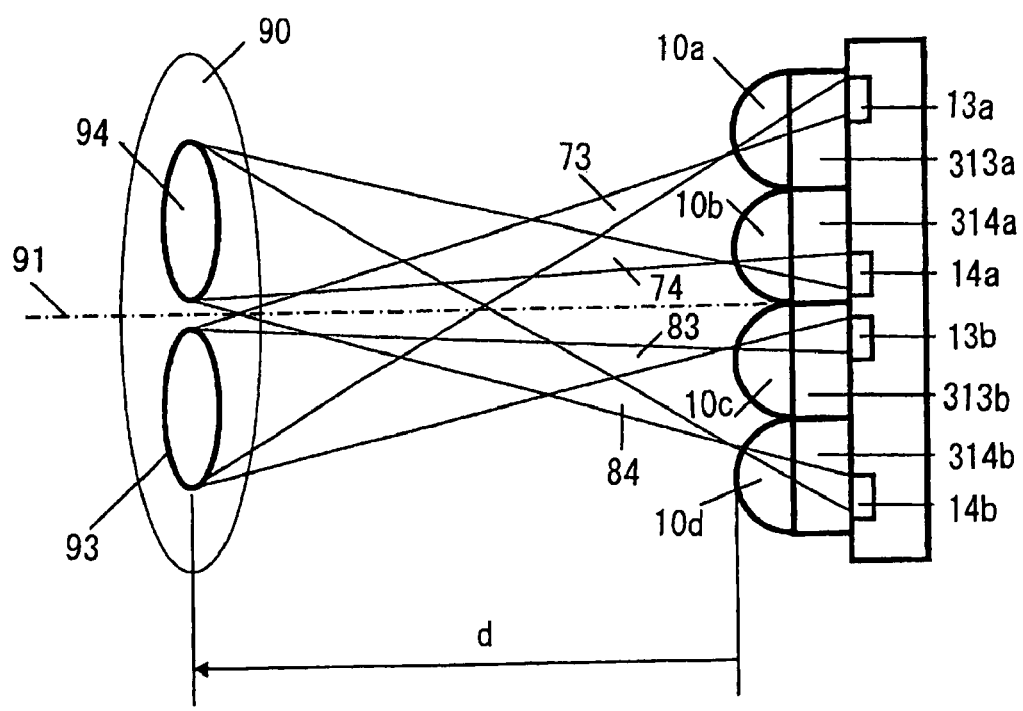
FIG. 10 shows the structure of a focus detection optical system that detects the focusing condition via micro-lenses in the focus detection. Set at the center of the photographic image plane by adopting the split-pupil phase detection method.

FIG. 10 shows the structure of a focus detection optical system that detects the focusing condition via micro-lenses in the focus detection area 101 set at the center of the photographic image plane by adopting the split-pupil phase detection method, in an enlargement of an area occupied by focus detection pixels. Reference numeral 90 indicates the pupil plane (hereafter referred to as a focus detection pupil plane) set over a distance d along the frontward direction from the micro-lenses disposed at the predetermined imaging plane of the interchangeable lens. The distance d is determined in correspondence to the curvature of the micro-lenses, the refractive index of the micro-lenses, the distance between the micro-lenses and the photoelectric conversion units and the like (referred to as the pupil distance for focus detection in this description). Reference numeral 91 indicates the optical axis of the interchangeable lens, reference numerals 10a~10d each indicate a micro-lens, reference numerals 13a, 13b, 14a and 14b each indicate a photoelectric conversion unit, reference numerals 313a, 313b, 314a and 314b each indicate a focus detection pixel and reference numerals 73, 74, 83 and 84 indicate focus detection light fluxes. Reference numeral 93 indicates a range defined by the photoelectric conversion units 13a and 13b projected via the micro-lenses 10a and 10c, reference numeral 94 indicates a range defined by the photoelectric conversion units 14a and 14b projected via the micro-lenses 10b and 10d, and the ranges are hereafter referred to as focus detection pupils.

While FIG. 10 schematically shows the four focus detection pixels (pixels 313a, 313b, 314a and 314b) disposed around the photographic optical axis 91, the photoelectric conversion units of other focus detection pixels disposed in the focus detection area 101 and focus detection pixels disposed in the focus detection areas 102 and 103 set toward the periphery of the photographic image plane also receive light fluxes arriving at their micro-lenses from the corresponding focus detection pupils 93 and 94. The focus detection pixels are arrayed in a direction matching the direction in which the pair of focus detection pupils are set side-by-side, i.e., the direction in which the photoelectric conversion units in each pair are set side-by-side.

The micro-lenses 10a~10d are disposed near the predetermined imaging plane of the interchangeable lens. Via the micro-lenses 10a~10d, the photoelectric conversion units 13a, 13b, 14a and 14b disposed behind them are projected onto the focus detection pupil plane 90 set apart from the micro-lenses 10a~10d by the pupil distance d for focus detection. The shapes of the projected photoelectric conversion units define the focus detection pupils 93 and 94. Namely, the positional relationship of the micro-lens and the photoelectric conversion unit relative to each other at each focus detection pixel is defined and the directions along which images of the photoelectric conversion units are projected via the individual focus detection pixels are thus determined so that the projected shapes (the focus detection pupils 93 and 94) of the photoelectric conversion units at the various focus detection pixels are aligned on the focus detection pupil 90 located over the projection distance d.

The photoelectric conversion unit 13a outputs a signal corresponding to the intensity of the image formed on the micro-lens 10a with the light flux 73 having passed through the focus detection pupil 93 and advanced toward the micro-lens 10a. The photoelectric conversion unit 13b outputs a signal corresponding to the intensity of the image formed on the micro-lens 10c with the light flux 83 having passed through the focus detection pupil 93 and advanced toward the micro-lens 10c. The photoelectric conversion unit 14a outputs a signal corresponding to the intensity of the image formed on the micro-lens 10b with the light flux 74 having passed through the focus detection pupil 94 and advanced toward the micro-lens 10b. In addition, the photoelectric conversion unit 14b outputs a signal corresponding to the intensity of the image formed on the micro-lens 10d with the light flux 84 having passed through the focus detection pupil 94 and advanced toward the micro-lens 10d.

By linearly disposing a great many of the two different types of focus detection pixels each structured as described above and integrating the outputs from the photoelectric conversion units at the individual pixels into output groups each corresponding to one of the two focus detection pupils 93 and 94, information related to the intensity distribution of the pair of images formed on the focus detection pixel column with the individual focus detection light fluxes passing through the focus detection pupil 93 and the focus detection pupil 94 is obtained. Image shift detection arithmetic processing (correlation arithmetic processing, phase difference detection processing) to be detailed later is subsequently executed by using the information thus obtained so as to detect the image shift amount manifested by the pair of images through the split-pupil phase detection method. Then, by executing a conversion operation on the image shift amount in correspondence to the distance between the gravitational centers of the pair of focus detection pupils, the deviation (defocus amount) of the current imaging plane (the imaging plane corresponding to the focus detection position on the photographic image plane) relative to the predetermined imaging plane (corresponding to the position of the micro-lens array) is calculated.

FIG. 11 presents a flowchart of the operation executed in the digital still camera 201 shown in FIG. 1. The body drive control device 214 starts the operation in step S110 and subsequent steps as the power to the digital still camera 201 is turned on in step S100. In step S110, a discriminative read of data (pixel signals) at imaging pixels is executed and the data are brought up on display at the liquid crystal display element 216. In the following step S120, a pair of sets of image data corresponding to the pair of images is read out from the focus detection pixel column. It is to be noted that the focus detection area will have been selected by the photographer via an area selector switch (not shown).

In step S130, the image shift detection arithmetic processing, to be detailed later, is executed based upon the pair of sets of image data having been read out and the image shift amount thus determined through the arithmetic operation is then converted to the defocus amount. In step S140, a decision is made as to whether or not the current condition is close to the focusing position, i.e., whether or not the absolute value of the calculated defocus amount is equal to or less than a predetermined value. If it is decided that the current condition is not close to the focusing position, the operation proceeds to step S150 to transmit the defocus amount to the lens drive control device 206 so as to enable the lens drive control device to drive the focusing lens 210 of the interchangeable lens 202 to the focusing position. Then, the operation returns to step S110 to repeatedly execute the operation described above. It is to be noted that the operation also branches to step S150 if focus detection is not possible, in order to transmit a scan drive instruction to the lens drive control device 206. In response, the lens drive control device drives the focusing lens 210 at the interchangeable lens 202 to scan over the range from infinity to close-up before the operation returns to step S110 to repeatedly execute the operation described above.

If it is decided in step S140 that the current condition is close to the focusing position, the operation proceeds to step S160 to make a decision as to whether or not a shutter release has occurred in response to an operation on the shutter release button (not shown). If it is decided that a shutter release has not occurred, the operation returns to step S110 to repeatedly execute the operation described above. If, on the other hand, it is decided that a shutter release has occurred, the operation proceeds to step S170 to transmit an aperture adjustment instruction to the lens drive control device 206 so as to set the aperture value at the interchangeable lens 202 to a control F number (an F number selected by the photographer or an automatically set F number). Once the aperture control ends, the image sensor 212 is engaged in image-capturing operation to read out image data from the imaging pixels and all the focus detection pixels in the image sensor 212.

In step S180, image data at the pixel positions occupied by the focus detection pixels in the focus detection pixel columns are generated through pixel interpolation executed based upon the data at imaging pixels present near the focus detection pixels. In the following step S190, image data made up with the data from the imaging pixels and the interpolated data are saved into the memory card 219 before the operation returns to step S110 to repeatedly execute the operation described earlier.

Next, the image shift detection arithmetic processing executed in step S130 in FIG. 11 is described in detail. Since the light quantity in the pair of images detected by the focus detection pixels may not be in balance due to vignetting of the focus detection pupils by the lens aperture opening, a specific type of correlation operation that assures the required level of image shift detection accuracy even when the light quantity is not in balance is executed. A correlation quantity $C(k)$ indicating the level of correlation is calculated as expressed in (1), through the correlation operation executed on a pair of data strings $(A1_1, \ldots, A1_M, A2_1, \ldots, A2_M$: M indicates the number of sets of data) read out from the focus detection pixel column.

$$C(k) = \Sigma |A1_n \cdot A2_{n+1+k} - A2_{n+k} \cdot A1_{n+1}| \tag{1}$$

In expression (1), the $\Sigma$ operation is cumulatively executed with regard to n and the range assumed for n is limited to the range over which the data $A1_n, A1_{n+1}, A2_{n+k}$ and $A2_{n+1+k}$ exist in correspondence to the image shift amount k. The image shift amount k is an integer which represents a relative shift amount assuming a value taken in units matching the data interval with which the data in the data strings are sampled.

Figure 12A:
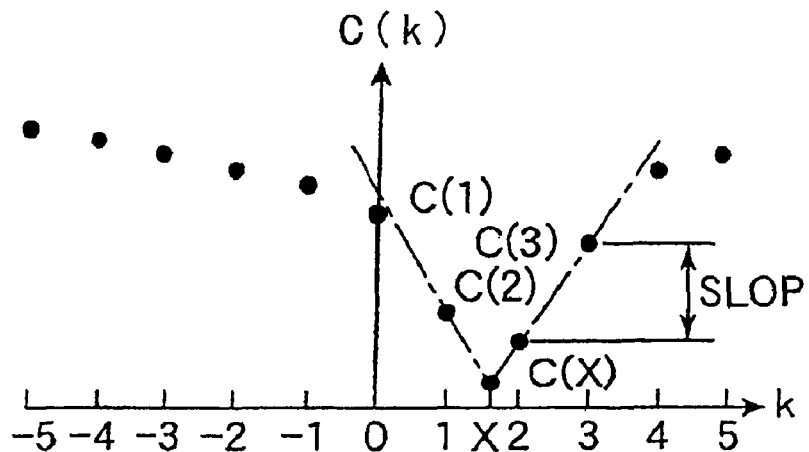
FIGS. 12A, 12B and 12C illustrate a method that may be adopted when judging the focus detection results.

The results of the arithmetic operation executed as expressed in (1) yield a correlation quantity $C(k)$ assuming the smallest value at the shift amount at which the pair of sets of data achieve a high level of correlation (when $k=k_j=2$ in FIG. 12A) (the level of correlation is higher when the correlation quantity $C(k)$ assumes a smaller value). The shift amount x, which gives the smallest value $C(x)$ in the continuous correlation quantity graph, is then determined by adopting a three-point interpolation method expressed in (2)~(5) below.

$$x = k_j + D/SLOP \tag{2}$$

$$C(x) = C(k_j) - |D| \tag{3}$$

$$D = \{C(k_j - 1) - C(k_j + 1)\}/2 \tag{4}$$

$$SLOP = MAX\{C(k_j + 1) - C(k_j), C(k_j - 1) - C(k_j)\} \tag{5}$$

Figure 12B:
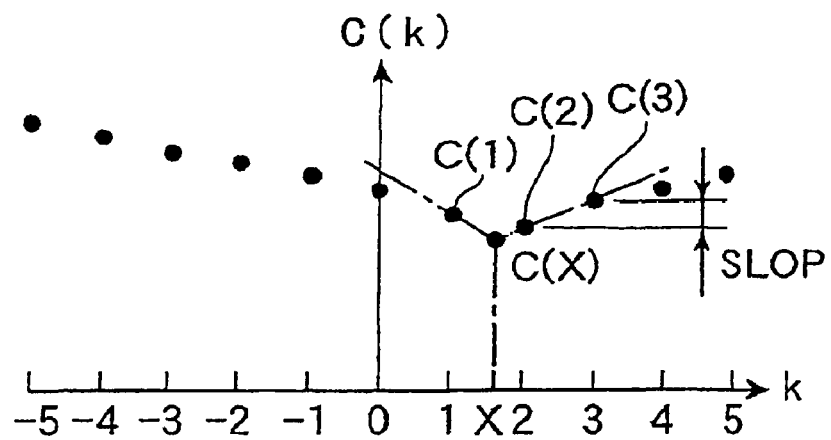

The judgment as to whether or not the shift amount x calculated as expressed in (2) is reliable is made as follows. As shown in FIG. 12B, the interpolated minimum value $C(x)$ of the correlation quantity increases when the level of correlation between the pair of sets of data is lower. Accordingly, if $C(x)$ is equal to or greater than a predetermined threshold value, the calculated shift amount is judged to be less reliable and the calculated shift amount x is canceled. Alternatively, $C(x)$ may be standardized with regard to the data contrast, and in such a case, if the value obtained by dividing $C(x)$ by SLOP indicating a value in proportion to the contrast is equal to or greater than a predetermined value, the calculated shift amount should be judged to be not reliable and accordingly, the calculated shift amount x should be canceled. As a further alternative, if SLOP indicating the value in proportion to the contrast is equal to or less than a predetermined value, the subject should be judged to be a low-contrast subject. Accordingly, the reliability of the calculated shift amount should be judged to be low and the calculated shift amount x should be canceled.

Figure 12C:
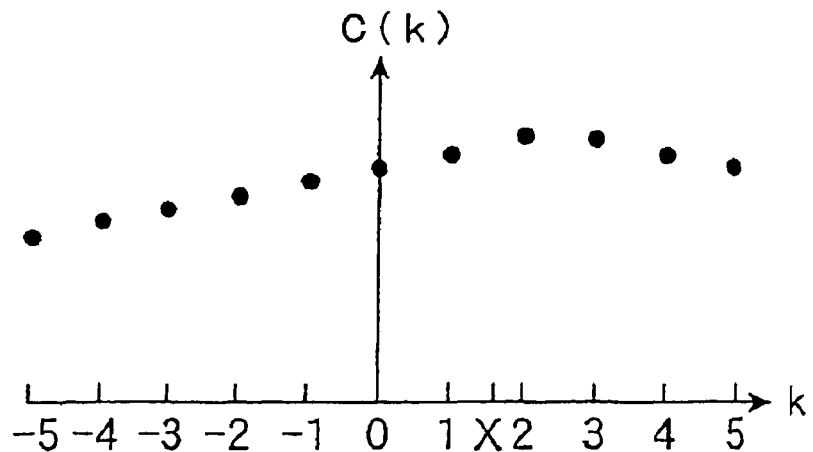

If the level of correlation between the pair of sets of data is low and the correlation quantity $C(k)$ does not dip at all over the shift range $k_{min}$ to $k_{max}$, as shown in FIG. 12C, the minimum value $C(x)$ cannot be determined. In this case, it is decided that focus detection cannot be executed.

It is to be noted that the correlation quantity $C(k)$ may be calculated through a correlation operation other than that expressed in (1), as long as the required level of image shift detection accuracy is assured even when the light quantity is not in balance. For instance, a correlation operation expressed as in expression (6) or (7) may be executed.

$$C(k) = \Sigma |(A1_n/A1_{n+1}) - (A2_{n+k}/A2_{n+1+k})| \tag{6}$$

$$C(k) = \Sigma |A1_n/A2_{n+k} - A1_{n+1}/A2_{n+1+k}| \tag{7}$$

In expression (6) or (7), the $\Sigma$ operation is cumulatively executed with regard to n and the range assumed for n is limited to the range over which the data $A1_n, A1_{n+1}, A2_{n+k}$ and $A2_{n+1+k}$ exist in correspondence to the shift amount k. As explained earlier, the light quantity forming the pair of images detected via the focus detection pixels may not be in balance due to vignetting of the focus detection pupils by the aperture opening of the lens and, accordingly, the correlation operation should be executed by using an operational expression that assures the required level of image shift detection accuracy in spite of the imbalance in the light quantity.

If the calculated shift amount x is judged to be reliable, the shift amount is converted to an image shift amount shft, as expressed in (8).

$$shft = PY \cdot x \tag{8}$$

PY in expression (8) represents the detection pitch. The image shift amount calculated as expressed in (8) is then converted to a defocus amount def by multiplying the image shift amount by a predetermined conversion coefficient $k_f$.

$$def = k_f \cdot shft \tag{9}$$

Figure 13:
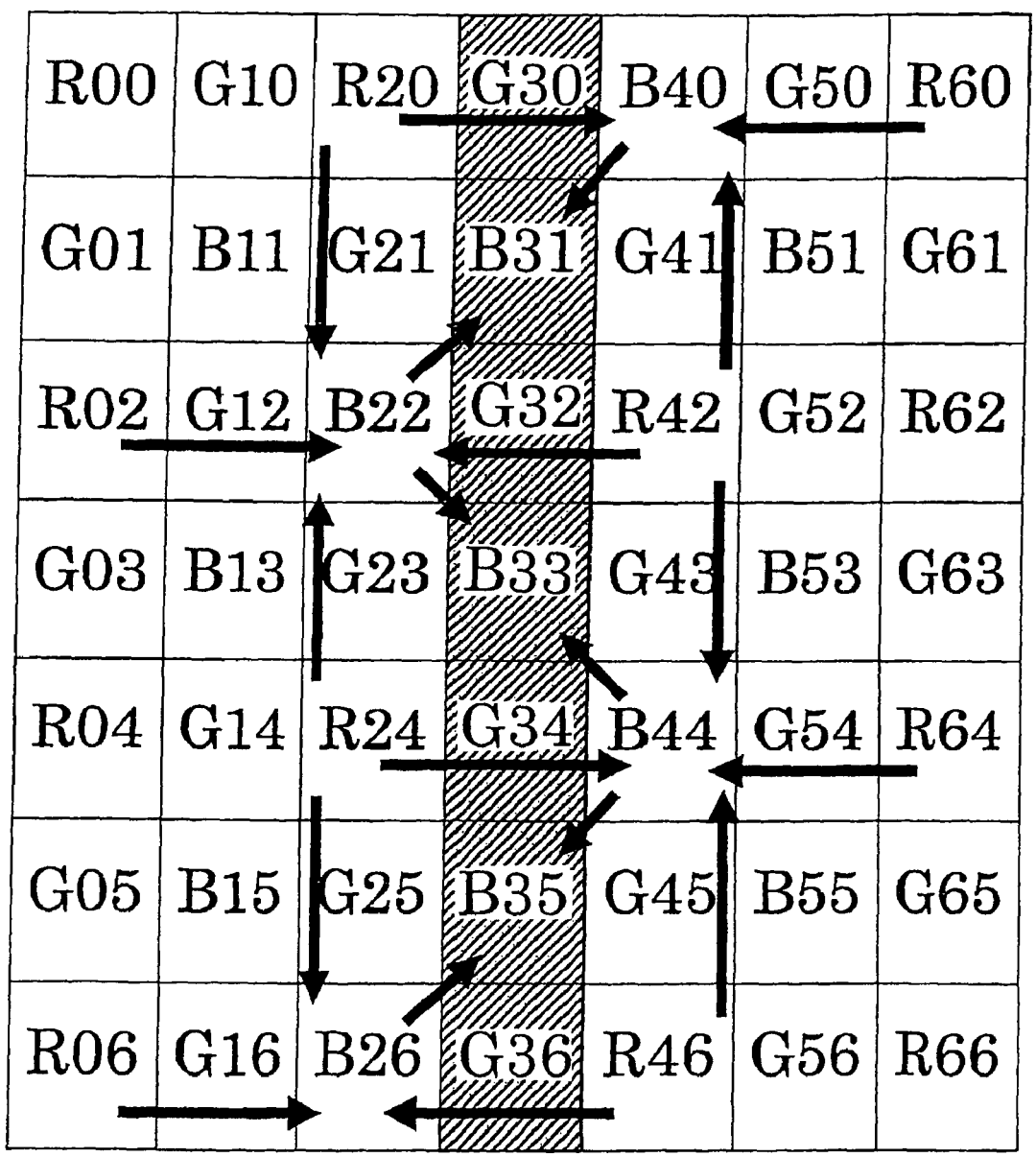
FIG. 13 shows in an enlargement an area around a focus detection pixel column at the image sensor shown in FIG. 3.

FIG. 13 shows in an enlargement an area near a focus detection pixel column at the image sensor 212 shown in FIG. 3. The method adopted when calculating image data (image signals) at the focus detection pixel positions in step 180 in FIG. 11 is now described in detail. Focus detection pixels are disposed at the shaded pixel positions (which should otherwise be occupied by G pixels and B pixels) in FIG. 13. The characters appended to each pixel are numerals indicating the row and the column at which the pixel is located relative to the upper left R pixel, whereas the letters R, G and B indicate the spectral sensitivity characteristics of the individual imaging pixels.

While R pixels and G pixels should normally occupy alternate positions in the columns on the left side and on the right side of the column where the focus detection pixels are disposed, every other position among all the positions that should be occupied by R pixels is instead occupied by a B pixel. In addition, the phases of the pixel arrangement on the left side and the pixel arrangement on the right side of the focus detection pixel column are offset relative to each other by two pixels along the vertical direction.

(1) The pixel signal at the position occupied by a focus detection pixel disposed where a G pixel should be normally disposed is determined by adding and averaging the pixel signals at four G pixels present nearby in the imaging pixel columns on the left side and the right side of the focus detection pixel. For instance, a pixel signal g32 at position G32 may be calculated as follows.

$$g32=(g21+g23+g41+g43)/4 \quad (10)$$

(2) The pixel signal at the position occupied by a focus detection pixel disposed where a B pixel should be normally disposed is determined by adding and averaging the pixel signals at two B pixels present nearby in the imaging pixel columns on the left side and the right side of the focus detection pixel. For instance, a pixel signal b33 at position B33 may be calculated as follows.

$$b33=(b22+b44)/2 \quad (11)$$

It is to be noted that the pixel signal b33 may instead be calculated by averaging four pixel signals b13, b22, b44 and b53, which include the pixel signals b13 and b53 at positions B13 and B53.

(3) The pixel signal at the position occupied by a B pixel, which should be normally occupied by an R pixel, in the imaging pixel column either on the left side or on the right side of the focus detection pixel column is calculated by adding and averaging the pixel signals at the four R pixels present at the closest positions along the horizontal direction and the vertical direction. For instance, a pixel signal r22 at position B22 may be calculated as follows.

$$r22=(r20+r02+r42+r24)/4 \quad (12)$$

In the embodiment described above, B pixels are disposed in the imaging pixel columns (where G pixels and R pixels are disposed in the Bayer array) on the two sides of the focus detection pixels disposed in a column that would otherwise be occupied by G pixels and B pixels. As a result, the pixel signal at a focus detection pixel position that would normally be occupied by a B pixel can be generated based upon pixel signals at nearby B pixels.

If the Bayer array is sustained in the imaging pixel columns on the two sides of the focus detection pixels, the pixel signal at a focus detection pixel position that would otherwise be occupied by a B pixel would need to be calculated by using the pixel signals at B pixels (B11, B13, B15, B51, B53 and B55 in FIG. 13) in the columns distanced from the focus detection pixel column by one column on the left side and on the right side. If a fine blue line or a blue edge is superimposed over the focus detection pixel column, the pixel signal obtained through the interpolation would manifest a significant error. However, a more accurate pixel signal can be obtained in the embodiment by using the pixel signals at the B pixels in the imaging pixel columns adjacent to the focus detection pixel column to assure an improvement in the image signal quality.

Namely, the pixel signal at a focus detection pixel position can be generated through interpolation based upon pixel signals at imaging pixels present near the focus detection pixel and thus, the image quality is not lowered according to the present invention.

It is to be noted that although not shown in FIG. 1, an optical low pass filter is normally disposed at a stage to the front relative to the image sensor 212 so as to magnify point images to a size comparable to that of the Bayer array unit (2 pixels×2 pixels). Thus, even a very fine blue line or a very sharp blue edge superimposed over the focus detection pixel column can be detected at the imaging pixel columns on the left side and the right side of the focus detection pixel column.

Other Embodiments of the Present Invention

Figure 14:
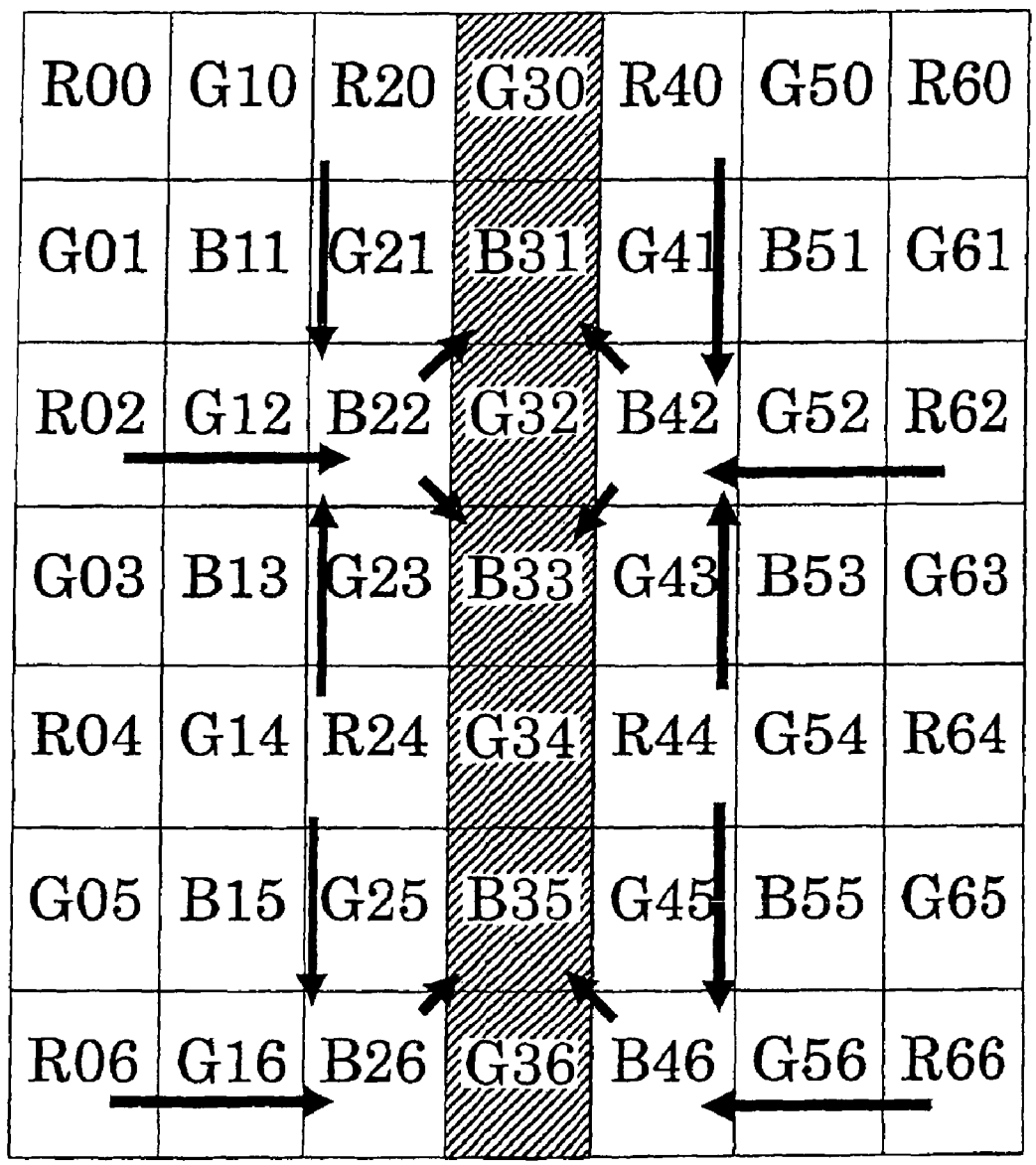
FIG. 14 shows in an enlargement an area around a focus detection pixel column in an image sensor achieved as a variation.

The array pattern to be assumed for imaging pixels in the columns on the two sides of the focus detection pixels is not limited to that shown in FIG. 13 and an alternative array pattern such as that shown in FIG. 14 may be adopted instead. FIG. 14 shows in an enlargement an area near a focus detection pixel column at the image sensor. Focus detection pixels are disposed at the shaded pixel positions (which should otherwise be occupied by G pixels and B pixels) in FIG. 14. While R pixels and G pixels would normally occupy alternate positions in the columns on the left side and on the right side of the column where the focus detection pixels are disposed, every other position among all the positions that should be occupied by R pixels is instead taken up by a B pixel. In addition, the phases of the pixel arrangement on the left side and the pixel arrangement on the right side of the focus detection pixel column are aligned with each other.

(1) The pixel signal at the position occupied by a focus detection pixel disposed where a G pixel should be normally disposed is determined by adding and averaging the pixel signals at four G pixels present nearby in the imaging pixel columns on the left side and the right side of the focus detection pixel. For instance, a pixel signal g32 at position G32 may be calculated as follows.

$$g32=(g21+g23+g41+g43)/4 \quad (13)$$

(2) The pixel signal at the position occupied by a focus detection pixel disposed where a B pixel should be normally disposed is determined by adding and averaging the pixel signals at two B pixels present nearby in the imaging pixel columns on the left side and the right side of the focus detection pixel. For instance, pixel signals b31 and b33 at positions B31 and B33 may be calculated as follows.

$$b31=b33=(b22+b42)/2 \quad (14)$$

It is to be noted that the pixel signals b31 and b33 may instead be calculated by averaging four pixel signals b13, b22, b44 and b53, which include the pixel signals b13 and b53 at positions B13 and B53.

(3) The pixel signal at the position occupied by a B pixel, which should be normally occupied by an R pixel, in the imaging pixel column either on the left side or the right side of the focus detection pixel column is calculated by adding and averaging the pixel signals at the three R pixels present at the closest positions along the horizontal direction and the vertical direction. For instance, a pixel signal r22 at position B22 may be calculated as follows.

$$r22=(r20+r02+r24)/3 \quad (15)$$

Alternatively, the pixel signal may be calculated by adding and averaging the pixel signals at seven R pixels present nearby along the horizontal direction, the vertical direction and the diagonal directions. For instance, the pixel signal r22 at position B22 may be calculated as follows.

$$r22=(r00+r20+r40+r02+r04+r24+r44)/7 \quad (16)$$

Figure 15:
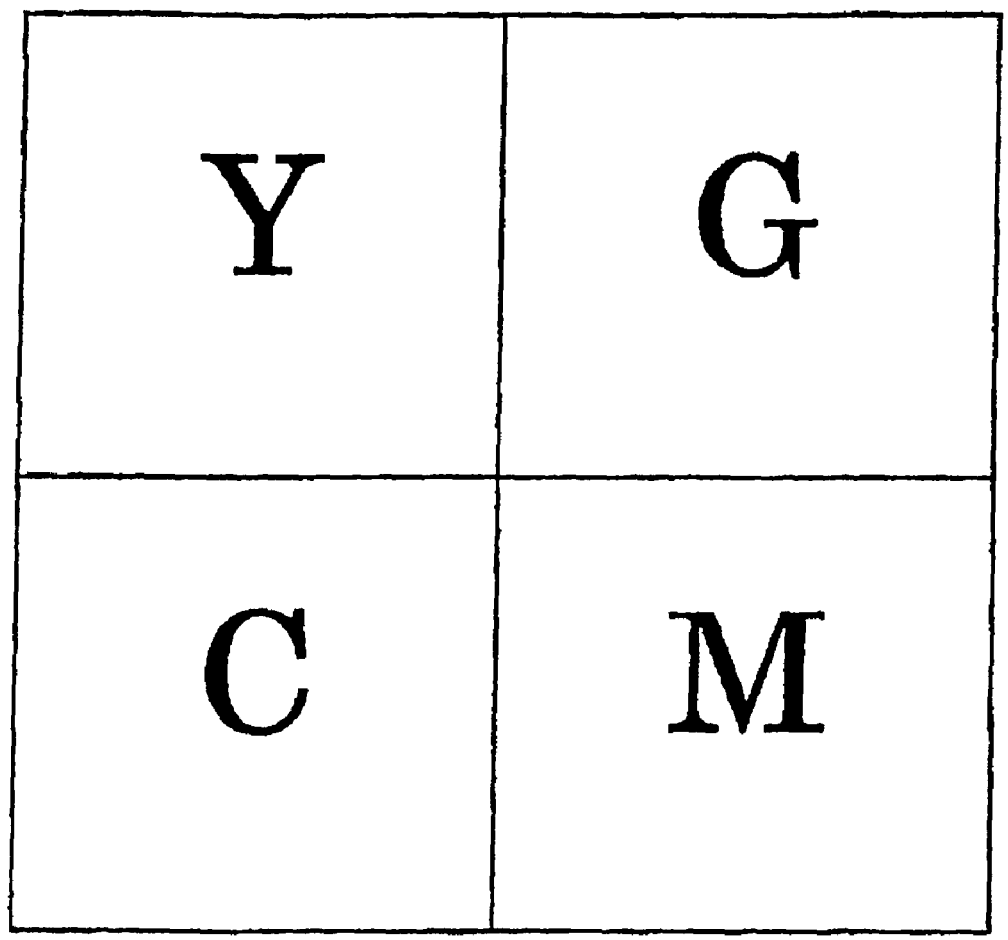
FIG. 15 shows a complementary color array.
Figure 16:
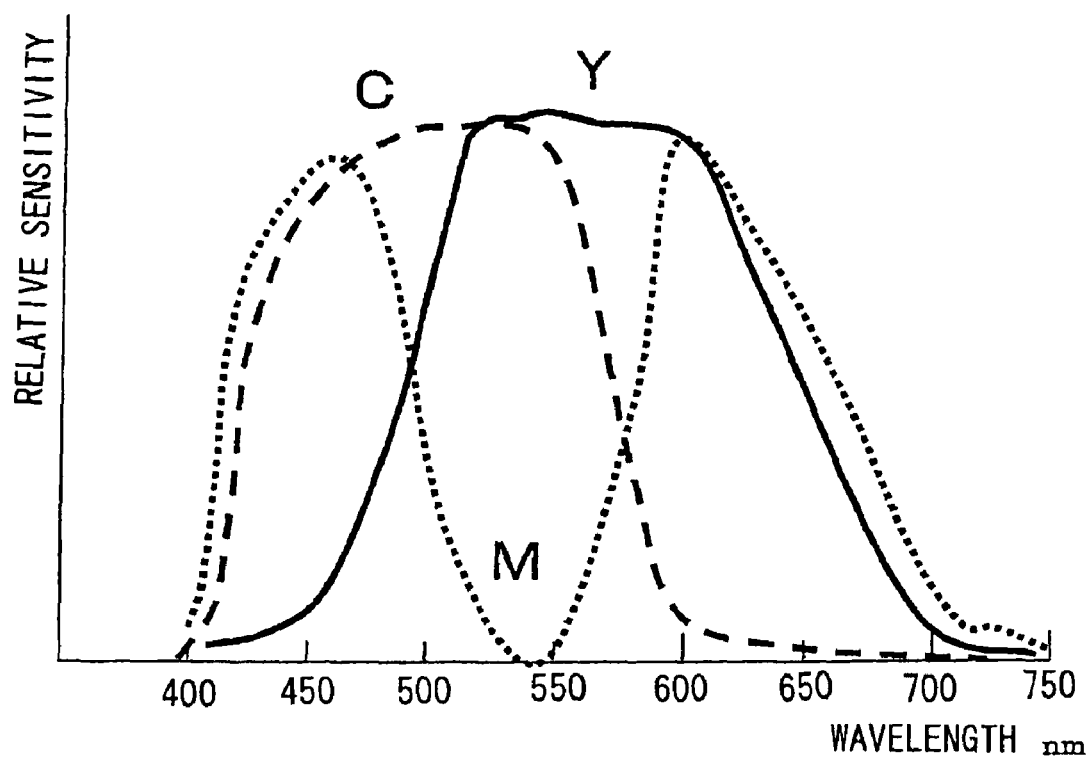
FIG. 16 shows the spectral sensitivity characteristics of imaging pixels equipped with complementary-color filters.

The present invention may be adopted in an image sensor with an array of imaging pixels equipped with complementary-color filters as described below, instead of an image sensor with an array of imaging pixels equipped with primary color filters assuming the colors R, G and B. FIG. 15 illustrates an array of imaging pixels equipped with complementary-color filters. Four pixels that include a green pixel (G pixel), a yellow pixel (Y pixel), a cyan pixel (C pixel) and a magenta pixel (M pixel) set as shown in FIG. 15 constitute the array unit of the array of imaging pixels equipped with the complementary-color filters and this array pattern is two-dimensionally reiterated on the image sensor. The spectral sensitivity characteristics of the yellow pixels (Y pixels), the cyan pixels (C pixels) and the magenta pixels (M pixels) are shown in FIG. 16.

Figure 17:
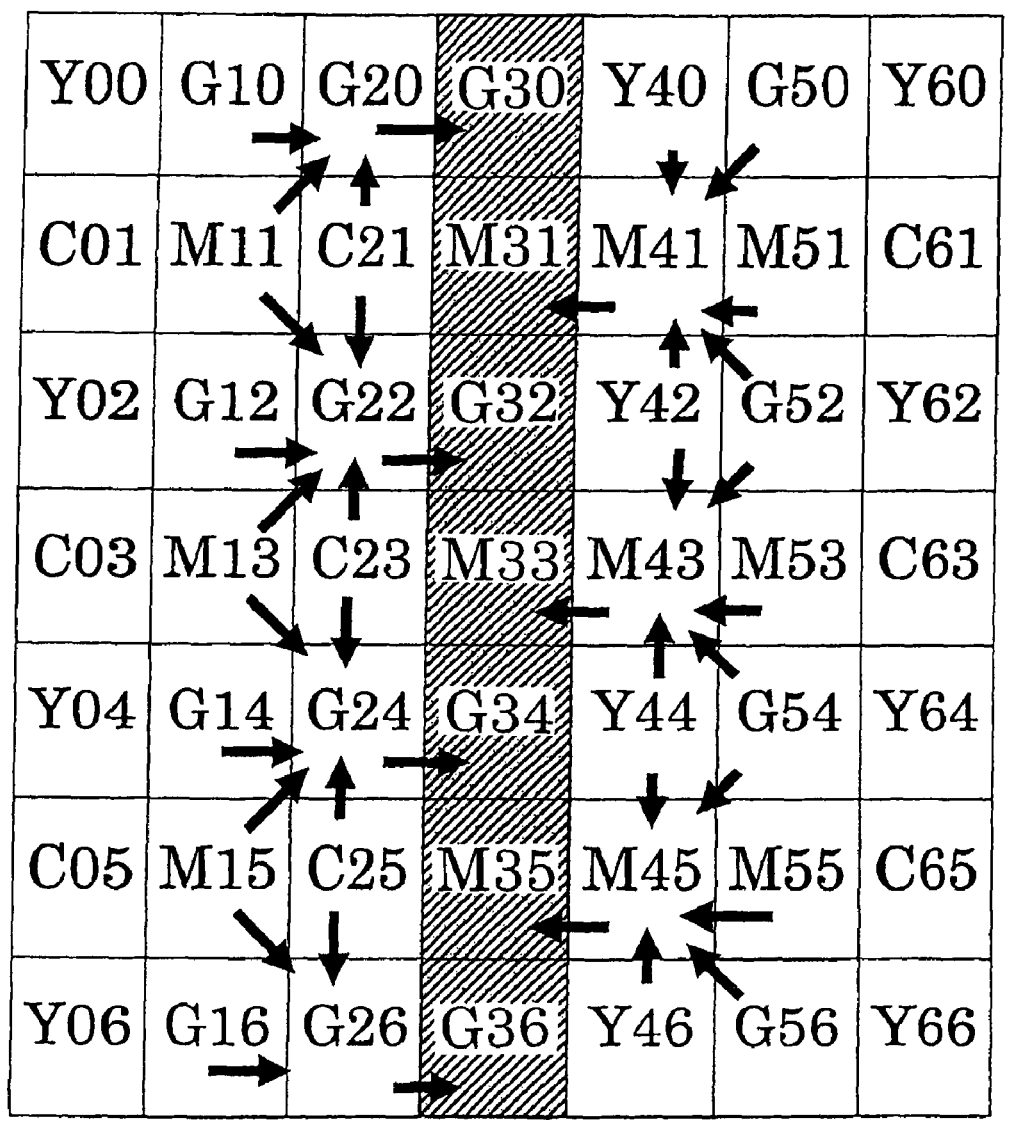
FIG. 17 shows in an enlargement of an area around a focus detection pixel column at an image sensor that includes imaging pixels disposed in a complementary color array.

FIG. 17 shows in an enlargement an area near a focus detection pixel column at the image sensor assuming a complementary color array of imaging pixels. Focus detection pixels are disposed at the shaded pixel positions (which should otherwise be occupied by G pixels and M pixels) in FIG. 17. While Y pixels and C pixels should normally occupy alternate positions in the columns on the left side and on the right side of the column where the focus detection pixels are disposed, a G pixel is disposed at each position that would normally be occupied by a Y pixel on the left side of the focus detection pixel column and an M pixel is disposed at each position that would otherwise be occupied by a C pixel on the right side of the focus detection pixel column.

(1) The pixel signal at a focus detection pixel position that would normally be occupied by a G pixel is obtained based upon the pixel signal at the G pixel adjacent to the subject focus detection pixel on the left side. For instance, a pixel signal g32 at position G32 may be determined as follows.

$$g32+g22 \quad (17)$$

(2) The pixel signal at the focus detection pixel position that would normally be occupied by an M pixel is obtained based upon the pixel signal at the M pixel adjacent to the subject focus detection pixel on the right side. For instance, a pixel signal m33 at position M33 may be determined as follows.

$$m33+m43 \quad (18)$$

(3) The pixel signal at the position occupied by a G pixel, which should normally be occupied by a Y pixel in the imaging pixel column adjacent to the focus detection pixel column on the left side is calculated by using the pixel signals at the five closest pixels present along the horizontal direction and the vertical direction, made up with a G pixel, M pixels and C pixels, based upon the relationship expressed as; c+y=2g+m, assumed by the pixel signals g, y, c and m at the G pixels, the Y pixels, the C pixels and the M pixels having the spectral sensitivity characteristics shown in FIG. 16. For instance, a pixel signal y22 at position G22 may be determined as follows.

$$y22=2 \cdot g12+(m11+m13)/2-(c21+c23)/2 \quad (19)$$

(4) The pixel signal at a position occupied by a M pixel, which should normally be occupied by a C pixel in the imaging pixel column adjacent to the focus detection pixel column on the left side is calculated by using the pixel signals at the five closest pixels present along the horizontal direction and the vertical direction, made up with G pixels, an M pixel and Y pixels, based upon the relationship expressed as; c+y=2g+m assumed by the pixel signals g, y, c and m at the G pixels, the Y pixels, the C pixels and the M pixels having the spectral sensitivity characteristics shown in FIG. 16. For instance, a pixel signal c43 at position G43 may be determined as follows.

$$c43=(g52+g54)+m53-(y42+y44)/2 \quad (20)$$

The positions that may be assumed by the focus detection areas in the image sensor are not limited to those shown in FIG. 2 and focus detection areas may also be set along the diagonal directions. In addition, more focus detection areas may be set along the horizontal direction and the vertical direction in addition to those shown in FIG. 2.

Figure 18:
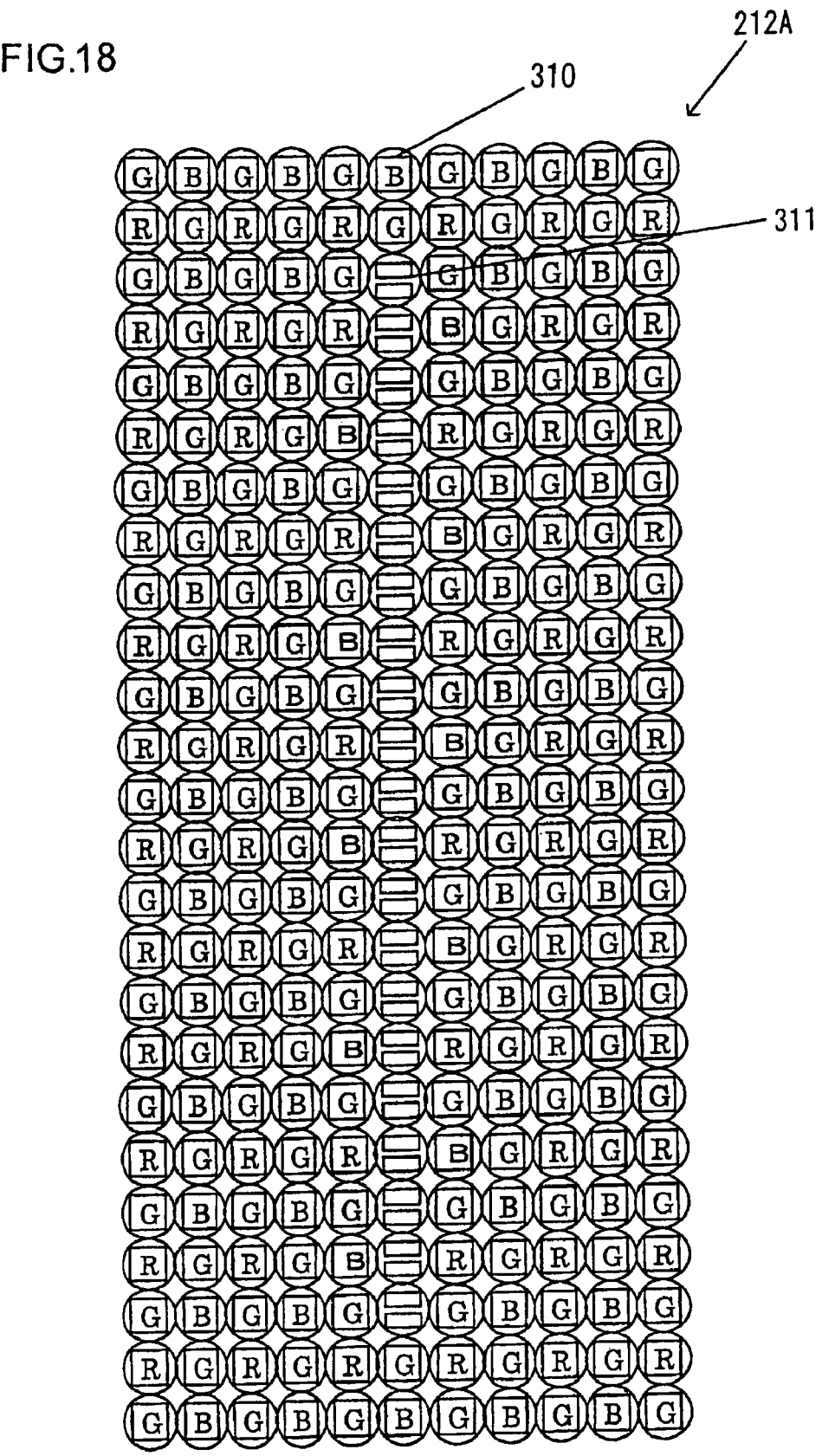
FIG. 18 presents a partial enlargement of an image sensor achieved in a variation.

While the focus detection pixels 313 and 314 at the image sensor 212 shown in FIG. 3 each include a single photoelectric conversion unit disposed therein, a pair of photoelectric conversion units may be disposed within each pixel. FIG. 18 is a partial enlargement of an image sensor 212A achieved in a variation, which includes focus detection pixels 311 each equipped with a pair of photoelectric conversion units disposed therein. Each focus detection pixel 311 fulfills a function achieved via a focus detection pixel 313 and a focus detection pixel 314 paired up with each other as shown in FIG. 3.

Figure 19:
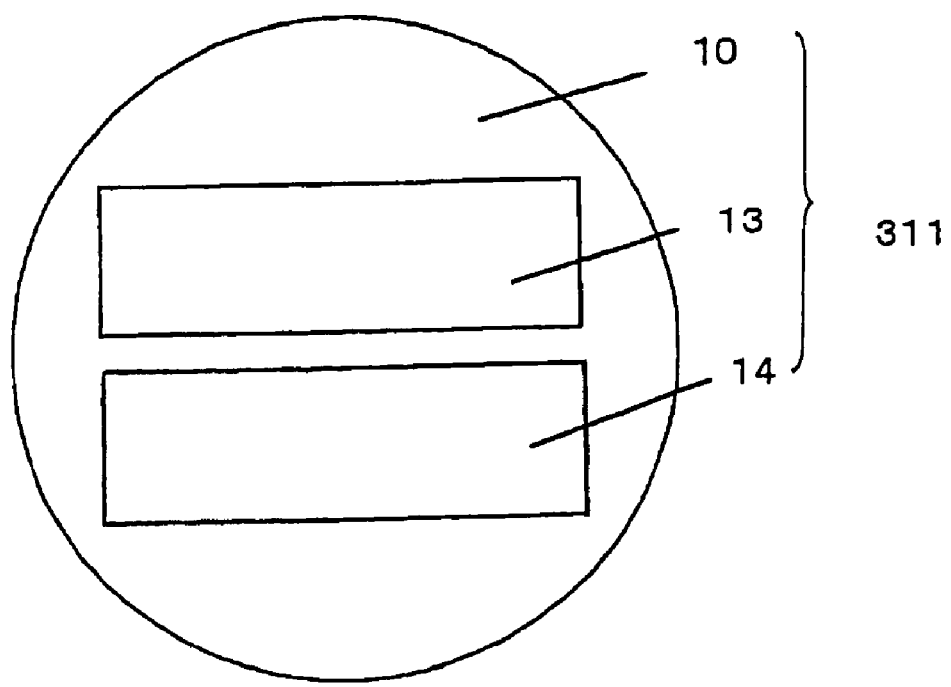
FIG. 19 is a front view showing the structure of a focus detection pixel.

As shown in FIG. 19, the focus detection pixels 311 each include a micro-lens 10 and a pair of photoelectric conversion units 13 and 14. No color filters are disposed at the focus detection pixels 311 in order to assure a sufficient light quantity and they assume spectral sensitivity characteristics achieved by integrating (see FIG. 7) of the spectral sensitivity of the photodiodes at which the photoelectric conversion takes place and the spectral sensitivity of the infrared filters (not shown), which also represents the sum of the spectral sensitivity characteristics of the green pixels, the red pixels and the blue pixels shown in FIG. 6. The light wavelength range of the focus detection pixel sensitivity is large enough to contain the light wavelength ranges of the sensitivity characteristics corresponding to the green pixels, the red pixels and the blue pixels.

Figure 20:
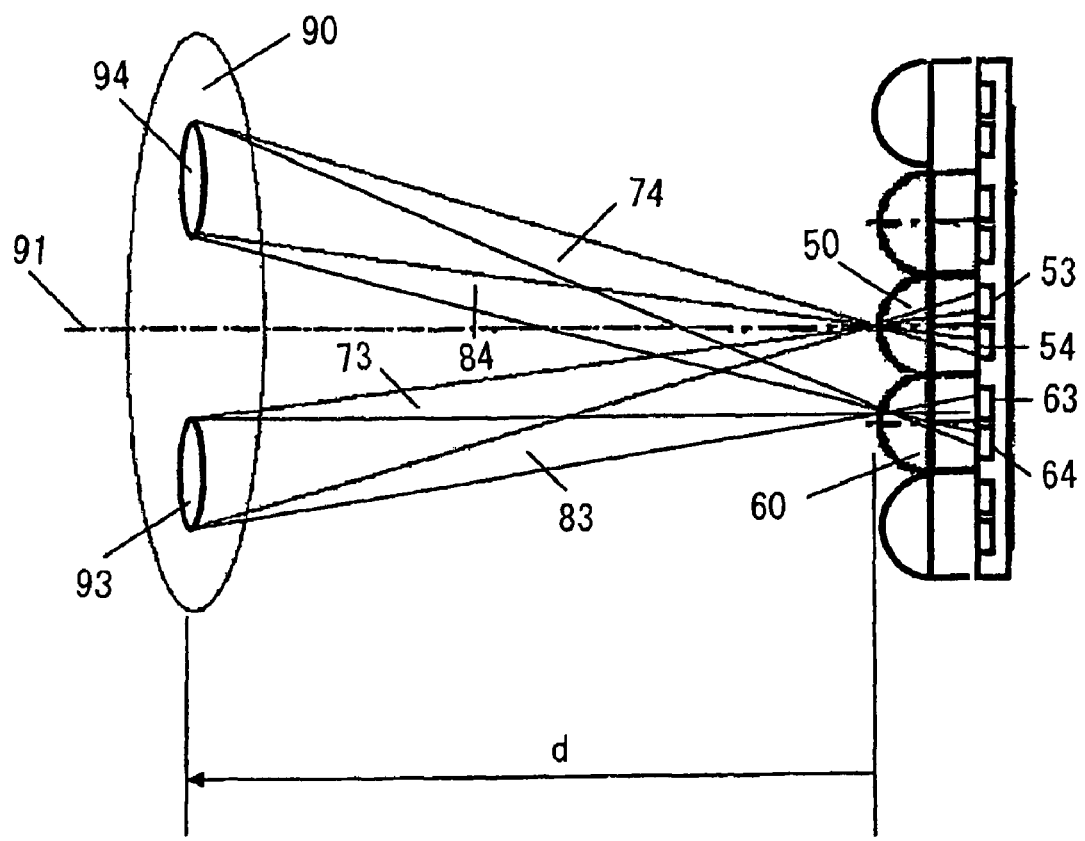
FIG. 20 illustrates how focus detection may be executed through the split-pupil phase detection method via focus detection pixels such as that shown in FIG. 19.

In reference to FIG. 20, a method that may be adopted when detecting the focusing condition via the focus detection pixels shown in FIG. 19 through the split-pupil phase detection method is explained. Reference numeral 90 indicates the exit pupil set over a distance d along the frontward direction from the micro-lenses disposed at the predetermined imaging plane of the interchangeable lens. The distance d is determined in correspondence to the curvature of the micro-lenses, the refractive index of the micro-lenses, the distance between the micro-lenses and the photoelectric conversion units and the like, and is referred to as the pupil distance for focus detection in this description. Reference numeral 91 indicates the optical axis of the interchangeable lens, reference numerals 50 and 60 each indicate a micro-lens, reference numerals (53, 54) and (63, 64) each indicate pairs of photoelectric conversion units at the focus detection pixels and reference numerals 73, 74, 83 and 84 indicate focus detection light fluxes.

Reference numeral 93 indicates a range defined by the photoelectric conversion units 53 and 63 projected via the micro-lenses 50 and 60, reference numeral 94 indicates a range defined by the photoelectric conversion units 54 and 64 projected via the micro-lenses 50 and 60, and these ranges are hereafter referred to as focus detection pixels. While FIG. 20 schematically illustrates the focus detection pixel set on the optical axis 91 (constituted with the micro-lens 50 and the pair of photoelectric conversion units 53 and 54) and an adjacent focus detection pixel (constituted with the micro-lens 60 and the pair of photoelectric conversion units 63 and 64), the pairs of photoelectric conversion units at focus detection pixels disposed in the peripheral area on the imaging plane, too, receive light fluxes departing the pair of focus detection pupils 93 and 94 and arriving at the individual micro-lenses.

The micro-lenses 50 and 60 are disposed near the predetermined imaging plane of the optical system. Via the micro-lenses 50 set on the optical axis 91, images of the pair of photoelectric conversion units 53 and 54 disposed behind the micro-lenses 50 and 60 by the pupil distance d for focus detection and the shapes of the projected photoelectric conversion units define the focus detection pupils 93 and 94. Likewise, via the micro-lens 60 adjacent to the micro-lens 50, images of the photoelectric conversion units 63 and 64 disposed behind are projected onto the exit pupil 90 set apart by the pupil distance d for focus detection and the shapes of the projected photoelectric conversion units define the focus detection pupils 93 and 94. Namely, the positional relationship of the micro-lens and the photoelectric conversion units at each pixel is defined so that the projected shapes (the focus detection pupils 93 and 94) of the photoelectric conversion units at the various focus detection pixels are aligned on the exit pupil 90 located over the pupil distance d for focus detection.

The photoelectric conversion unit 53 outputs a signal corresponding to the intensity of the image formed on the micro-lens 50 with the light flux 73 having passed through the focus detection pupil 93 and advanced toward the micro-lens 50. The photoelectric conversion unit 54 outputs a signal corresponding to the intensity of the image formed on the micro-lens 50 with the light flux 74 having passed through the focus detection pupil 94 and advanced toward the micro-lens 50. Likewise, the photoelectric conversion unit 63 outputs a signal corresponding to the intensity of the image formed on the micro-lens 60 with the light flux 83 having passed through the focus detection pupil 93 and advanced toward the micro-lens 60. In addition, the photoelectric conversion unit 64 outputs a signal corresponding to the intensity of the image formed on the micro-lens 60 with the light flux 84 having passed through the focus detection pupil 94 and advanced toward the micro-lens 60.

By linearly disposing a large number of such focus detection pixels and integrating the outputs from the pairs of photoelectric conversion units at the individual pixels into output groups each corresponding to one of the two focus detection pupils 93 and 94, information related to the intensity distribution of the pair of images formed on the focus detection pixel column with the individual focus detection light fluxes passing through the focus detection pupil 93 and the focus detection pupil 94 is obtained. Image shift detection arithmetic processing (correlation arithmetic processing, phase difference detection processing) is subsequently executed by using the information thus obtained so as to detect the image shift amount manifested by the pair of images through the split-pupil phase detection method. Then, by executing a specific type of processing on the image shift amount, the deviation (defocus amount) of the current imaging plane (the imaging plane corresponding to the focus detection position on the photographic image plane) relative to the predetermined imaging plane (corresponding to the position of the micro-lens array) is calculated.

While the focus detection pixels in the image sensor 212 shown in FIG. 3 are not equipped with color filters, the present invention may be adopted in conjunction with focus detection pixels equipped with color filters, the color of which matches one of the colors of the color filters at the imaging pixels (e.g., green filters).

While the focus detection pixels shown in FIGS. 5 and 19 each include (a) photoelectric conversion unit(s) assuming a semicircular shape and a rectangular shape respectively, the photoelectric conversion units may assume a shape other than these. For instance, the photoelectric conversion units in the focus detection pixels may assume an elliptical shape, a polygonal shape or the like.

In the above embodiments, for reasons of expediency, "row" is used regarding horizontal pixels in the image sensors. However, "row" may also be used regarding vertical pixels.

The image-capturing apparatus according to the present invention may be embodied as an apparatus other than a digital still camera or a film still camera with an interchangeable lens detachably mounted at the camera body. For instance, the present invention may be adopted in a digital still camera or a film still camera with an integrated lens. It may also be adopted in a video camera, a compact camera module built into a portable telephone or the like, a surveillance camera, a visual recognition device used in robotics applications or the like as well. The present invention may be further adopted in a focus detection device installed in a device other than a camera, a range-finding device or a stereo range-finding device.

What is claimed is:

1. An image sensor, comprising:
   a plurality of imaging pixel rows, which include a plurality of types of imaging pixels with varying spectral sensitivity characteristic that are arrayed two-dimensionally based upon a first spectral sensitivity characteristics array pattern; and
   at least one non-imaging pixel row, which includes a plurality of non-imaging pixels that are disposed in place of some of the plurality of types of imaging pixels in the plurality of imaging pixel rows, wherein:
   the plurality of imaging pixel rows include adjacent imaging pixel rows made up with the plurality of types of imaging pixels and set adjacent to the non-imaging pixel row; and
   the adjacent imaging pixel rows assume a second spectral sensitivity characteristics array pattern different from the first spectral sensitivity characteristics array pattern, so that spectral sensitivity characteristics different from spectral sensitivity characteristics achieved in conformance to the first spectral sensitivity characteristics array pattern are achieved via specific imaging pixels making up part of the adjacent imaging pixel rows.

2. An image sensor according to claim 1, wherein:
   the specific imaging pixels all assume spectral sensitivity characteristics identical to one another.

3. An image sensor according to claim 2, wherein:
   the non-imaging pixel row extends linearly; and
   the adjacent imaging pixel rows include a pair of adjacent pixel rows each set on either side of the non-imaging pixel row, phases of the second spectral sensitivity characteristics array pattern assumed for one of the adjacent imaging pixel rows making up the pair and the second spectral sensitivity characteristics array pattern assumed for the other adjacent imaging pixel row in the pair are offset relative to each other along a direction in which the non-imaging pixel row extends.

4. An image sensor according to claim 2, wherein:

the non-imaging pixel row extends linearly; and the adjacent imaging pixel rows include a pair of adjacent pixel rows each set on either side of the non-imaging pixel row, and phases of the second spectral sensitivity characteristics array pattern assumed for one of the adjacent imaging pixel rows making up the pair and the second spectral sensitivity characteristics array pattern assumed for the other adjacent imaging pixel row in the pair are aligned relative to each other along a direction in which the non-imaging pixel row extends.

5. An image sensor according to claim 3, wherein:

the plurality of types of imaging pixels disposed with the first spectral sensitivity characteristics array pattern include three types of imaging pixels with high levels of spectral sensitivity to red, green and blue;

red pixels, green pixels and blue pixels, making up the three types of imaging pixels, are disposed in the plurality of imaging pixel rows in a Bayer array;

the plurality of non-imaging pixels are disposed in place of the green pixels and blue pixels that are the some of the plurality of types of imaging pixels; and the adjacent imaging pixel rows contain the blue pixels.

6. An image sensor according to claim 1, wherein:

the plurality of non-imaging pixels are a plurality of focus detection pixels each equipped with a micro-lens and at least one photoelectric conversion unit, which output focus detection signals used to detect a focusing condition of an optical system through which an image is formed on a light-receiving surface of the image sensor.

7. An image sensor according to claim 6, wherein:

the plurality of focus detection pixels include first focus detection pixels and second focus detection pixels;

the first focus detection pixels each include the micro-lens and a first photoelectric conversion unit disposed in correspondence to the micro-lens;

the second focus detection pixels each include the micro-lens and a second photoelectric conversion unit disposed in correspondence to the micro-lens; and the first focus detection pixels and the second focus detection pixels are disposed alternately to each other in the non-imaging pixel row.

8. An image sensor according to claim 6, wherein:

the plurality of focus detection pixels each include the micro-lens and a pair of photoelectric conversion units disposed in correspondence to the micro-lens.

9. A focus detection device, comprising:

an image sensor according to claim 6; and a focus detection unit that detects the focusing condition of the optical system based upon the focus detection signals output from the plurality of focus detection pixels.

10. A focus adjustment device, comprising:

a focus detection device according to claim 9; and a focus adjustment unit that executes focus adjustment for the optical system based upon the focusing condition detected by the focus detection unit.

11. An image-capturing apparatus, comprising:

an image sensor according to claim 1; and an arithmetic operation unit that generates through arithmetic operation image signals at positions each occupied by each of the plurality of non-imaging pixels based upon pixel signals at the plurality of types of imaging pixels disposed in the adjacent imaging pixel rows with the second spectral sensitivity characteristics array pattern.

* * * * *